US012717762B2

(12) United States Patent
Portisch et al.

(10) Patent No.: US 12,717,762 B2
(45) Date of Patent: Aug. 25, 2026

(54) LIST ALIGNMENT META STRUCTURE AND TOOL

(71) Applicant: SAP SE, Walldorf (DE)

(72) Inventors: Jan Portisch, Bruchsal (DE); Radu Purdel, Bucharest (RO); Dirk Becker, Malsch (DE); Markus Bucher, Heidelberg (DE); Sandra Bracholdt, Dielheim (DE)

(73) Assignee: SAP SE, Walldorf (DE)

(*) Notice: Subject to any disclaimer, the term of this patent is extended or adjusted under 35 U.S.C. 154(b) by 228 days.

(21) Appl. No.: 17/543,288

(22) Filed: Dec. 6, 2021

(65) Prior Publication Data

US 2023/0177023 A1 Jun. 8, 2023

(51) Int. Cl.
*G06F 16/21* (2019.01)
*G06N 20/00* (2019.01)

(52) U.S. Cl.
CPC ........... *G06F 16/211* (2019.01); *G06N 20/00* (2019.01)

(58) Field of Classification Search
CPC .............................. G06F 16/211; G06N 20/00
USPC .......................................................... 707/781
See application file for complete search history.

(56) References Cited

U.S. PATENT DOCUMENTS

| | | | | |
|---|---|---|---|---|
| 9,311,144 | B1 * | 4/2016 | Krishnamoorthy | G06F 16/93 |
| 11,159,576 | B1 * | 10/2021 | Ly | G06F 16/2365 |
| 2018/0081943 | A1 * | 3/2018 | Johnson | G06F 16/2477 |
| 2018/0210927 | A1 * | 7/2018 | Karam | G06F 16/24568 |
| 2020/0250176 | A1 * | 8/2020 | Padmanabhan | G06F 16/27 |
| 2020/0252205 | A1 * | 8/2020 | Padmanabhan | G06F 9/466 |
| 2020/0349130 | A1 | 11/2020 | Bracholdt et al. | |
| 2021/0073196 | A1 * | 3/2021 | Schub | G06F 16/221 |
| 2021/0226774 | A1 * | 7/2021 | Padmanabhan | H04L 9/3239 |
| 2021/0240818 | A1 * | 8/2021 | Seksenov | G06F 16/986 |
| 2021/0318995 | A1 * | 10/2021 | Portisch | G06F 16/211 |
| 2021/0352099 | A1 * | 11/2021 | Rogers | G06N 20/00 |

* cited by examiner

*Primary Examiner* — Boris Gorney
*Assistant Examiner* — Nicholas E Allen
(74) *Attorney, Agent, or Firm* — SCHWEGMAN LUNDBERG & WOESSNER, P.A.

(57) ABSTRACT

In an example embodiment, a persistence model is utilized that allows the storage of value lists in a referenceable and reusable manner. This allows for two lifecycle options for value lists: (i) schema-dependent and (ii) schema-independent. Thus, the lifecycle of all involved entities (e.g., schemas, values, correspondences, etc.) is managed. This enables easier upgrades, downgrades, and sidegrades. The persistence is a directed graph, which comprises nodes and directed edges. This persistence can then be used to recommend additional correspondences to a user.

20 Claims, 16 Drawing Sheets

200

DATA SCHEMA 2 226

SCHEMA OBJECT 2 228

ALIGNMENT 214

MAPPING 216

RULE STACK 218

RULES 220

CONSEQUENCE 224

RULE BUILDING BLOCKS 222

DATA SCHEMA 202

SCHEMA OBJECT 204

VIRTUAL SCHEMA OBJECT 208

RELATIONSHIP 206

VALUE LIST 210

VALUES 212

LIST ALIGNMENT META STRUCTURE AND TOOL

BACKGROUND

Organizations usually run a patchwork of different computer applications from various vendors. Each of these computer systems may come with its own schema (the structure in which the data is persistent). In some instances, these disparate computer systems may work on the same type of data. For example, customer data may be used by a marketing application but also by a billing application.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
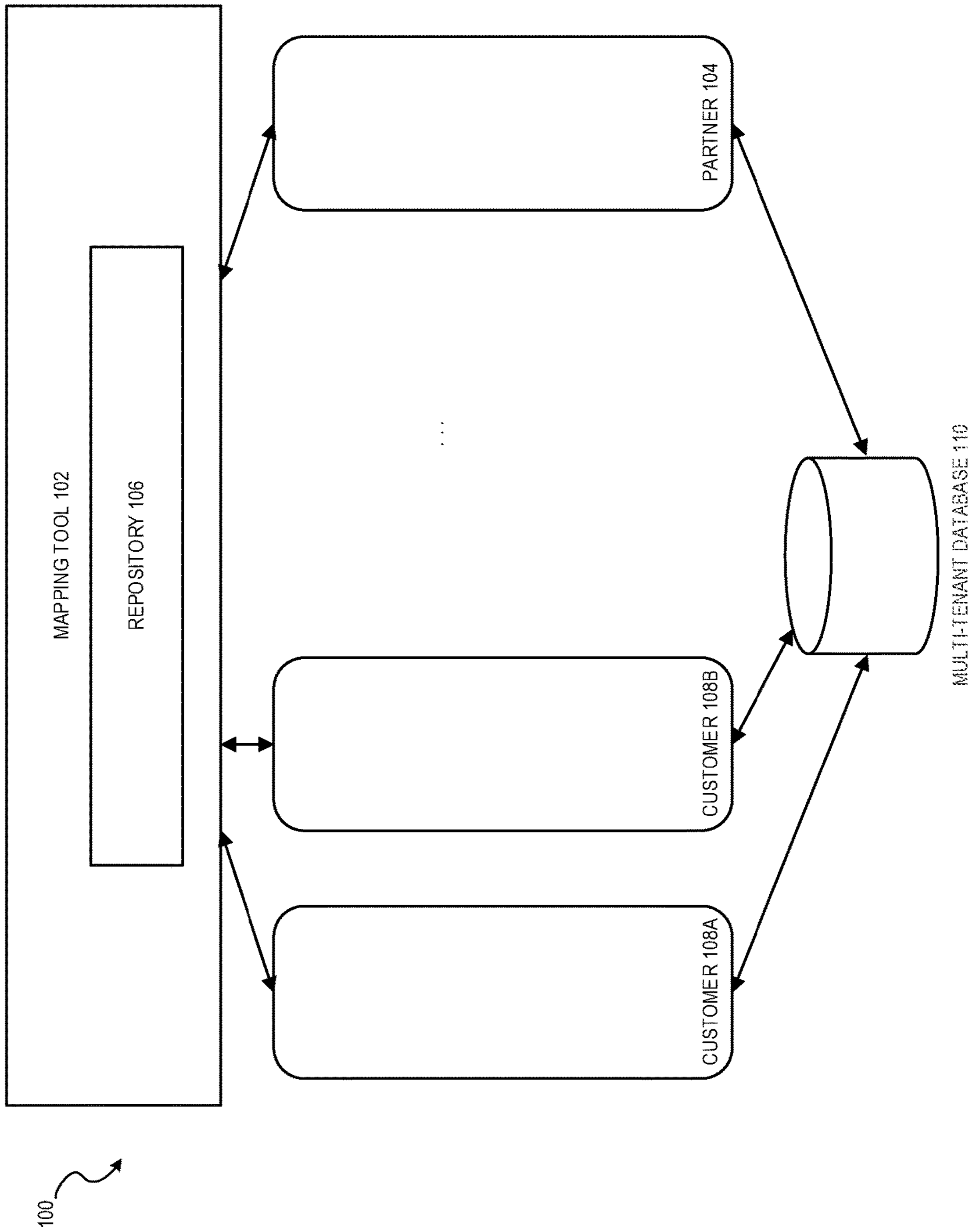
FIG. 1 is a block diagram illustrating a system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

As described previously, enterprises may run multiple applications with different schemas, but that operate on the same type of data. Without any sort of data integration effort, data silos are created. Data silos are collections of data held by one group that is not easily or fully accessible by other groups in the same organization. Data silos present technical problems to an organization, however, because they cause information to not be accessible to everyone in their company and prevent the organization from exploiting their data easily. Additionally, data integrity is violated when two data silos exist for the same type of data. For example, customer data in a marketing silo may differ from customer data in a billing silo, causing confusion and errors. There winds up being no "true" view of data (i.e., no single source of truth). Additionally, in certain industries, legal regulations require only a single view for certain types of data.

In order to allow for application interoperability as well as one view on all data, the data should be integrated. One way of doing this is to perform schema matching. In schema matching, attributes of one schema are mapped to attributes of another schema, causing an alignment between the two schemas. Enterprise data schemas, however, are very large and very complex. They often comprise thousands of entities, attributes, and relations among entities. Even when it is known which attributes match, their values need to be mapped. Enterprise data schemas also typically come with thousands of predefined values that need to be mapped. The result is that integration is very expensive and normally is carried out by technical experts as well as domain experts. For example, a project lead of an integration project may use a mapping tool where matching schema elements are annotated. Even if 4,000 attributes and 400 entities have already been matched, the predefined values of matching attributes have to be mapped. If, on average, each attribute has 12 predefined values, this means that 48,000 matches still need to be annotated.

Further, value list matching is a repetitive problem. Many values occur many times. For example, the currency values of a Loan entity may be the same as currency values of a Depreciation entity.

Further, value list matching is a moving target problem. While the matching is occurring, the values of some lists may be updated multiple times due to customers changing some predefined value lists by adding further customized values.

Further, value list matching uses an ordered process. Any error, for example a typographical error, that makes its way into a mapping can cause the entire integration to fail.

In an example embodiment, a persistence model is utilized that allows the storage of value lists in a referenceable and reusable manner. This allows for two lifecycle options for value lists: (i) schema-dependent and (ii) schema-independent. Thus, the lifecycle of all involved entities (e.g., schemas, values, correspondences, etc.) is managed. This enables easier upgrades, downgrades, and sidegrades. The persistence is a directed graph, which comprises nodes and directed edges. More particularly, in an example embodiment a Resource Description Framework (RDF) graph is utilized. In an RDF graph, triples are used. These triples are based on an Entity Attribute Value (EAV), in which the subject is the entity, the predicate is the attribute, and the object is the value. Each triple has a unique identifier known as a Uniform Resource Identified (URI). URIs may resembled web page addresses. The parts of a triple, namely the subject, predicate, and object, represent links in the graph. Edges may point to other nodes (object properties) or edges may point to strings (datatype properties), which terminate the graph. This is in contrast to using lookup tables for persistence of value list mappings, without the notion of lifecycle, data management, or documentation.

Furthermore, in an example embodiment, a mapping tool is provided to manage value lists that are persisted. Mappings are stored in a central, cross-tenant system handling data access. A central system is the foundation for intelligent reuse of stored information. The system allows for cross-tenant data access to provide smart services based on cross-tenant data to each individual tenant, while keeping the individual tenant's data private. Traditional runtimes are ignorant of the semantics of the data they hold, preventing reuse and higher-value smart services.

Additionally, in an example embodiment, a smart algorithm is provided, which is a machine-learned model that exploits the collective knowledge available in a repository of the mapping tool (and which may be maintained by multiple independent parties). The smart algorithm is able to confidential map value lists and values in a fully automated manner, whereby the derived correspondences do not need human inspection (although a human control element may optionally be added).

The smart algorithm exploits the existing list and value mappings, and is capable of selecting matching candidates even when the value list is not known to the system. The more the system is used, the better the smart algorithm gets. Traditional systems cannot implement such a smart algorithm, which they lack the ability to persist value list mappings in a manner that considers the notion of lifecycle, data management, or documentation, and lack the ability to provide cross-tenant learning for the model. Additionally, traditional systems lack the idea of how to propose data-driven services.

It should be noted that while an embodiment of the solution is described herein in the context of a triple store, and more particularly triple stores used to store graph structures, in some example embodiments another type of data store, such as a relational database, is used.

FIG. 1 is a block diagram illustrating a system 100, in accordance with an example embodiment. Here, mapping tool 102 allows for cross-customer access. More particularly, a partner may publish value list alignments, which are stored by the mapping tool in the repository 106. The partner may provide these alignments as, for example, a subscription service. Multiple different customers, such as customers 108A, 108B may then access these value list alignments and also provide their own value list alignments to the mapping tool 104.

It should be noted that customers 108A, 108B may be different tenants of a shared multi-tenant database 110. In the multi-tenant database 110, actual values for data organized in line with particular schemas may be stored in a manner than one tenant's data cannot be accessed by another tenant's data. The mappings corresponding to these schemas, however, may themselves be shared by the customers 108A, 108B via the repository. Thus, for example, customer 108A's data may be stored in line with schema A in the shared multi-tenant database 110, and customer 108B's data may be stored in line with schema A in the shared multi-tenant database 100, in such a way that customer 108A cannot access customer 108B's data and vice-versa, if customer 108A identifies a mapping between an attribute of schema A and schema B, this mapping may be stored in the repository 106 and may be accessible to customer 108B.

For definition purposes, a schema is a collection of schema elements that are represented as nodes. A schema is versioned. Only schema nodes can be mapped (i.e., appear in a correspondence), nothing else. An alignment is a set of correspondences. It also may be versioned and hold a link between exactly two schema versions. A correspondence maps one target node to zero or more source nodes.

A value list is a set of values. In the repository, the list is represented as a node of type VALUE_LIST and carries at least the datatype properties of name and description. The values are represented as nodes of type VALUE and carry at least datatype properties of value and description. A value list node has zero or more value nodes, expressed via an object property HAS_VALUE. A value node has exactly one assigned value node list.

A node of type ATTRIBUTE has zero or one assigned VALUE_LIST. A value list may be assigned to zero or more attributes—expressed via the object property HAS_VALUE_LIST.

Figure 2:
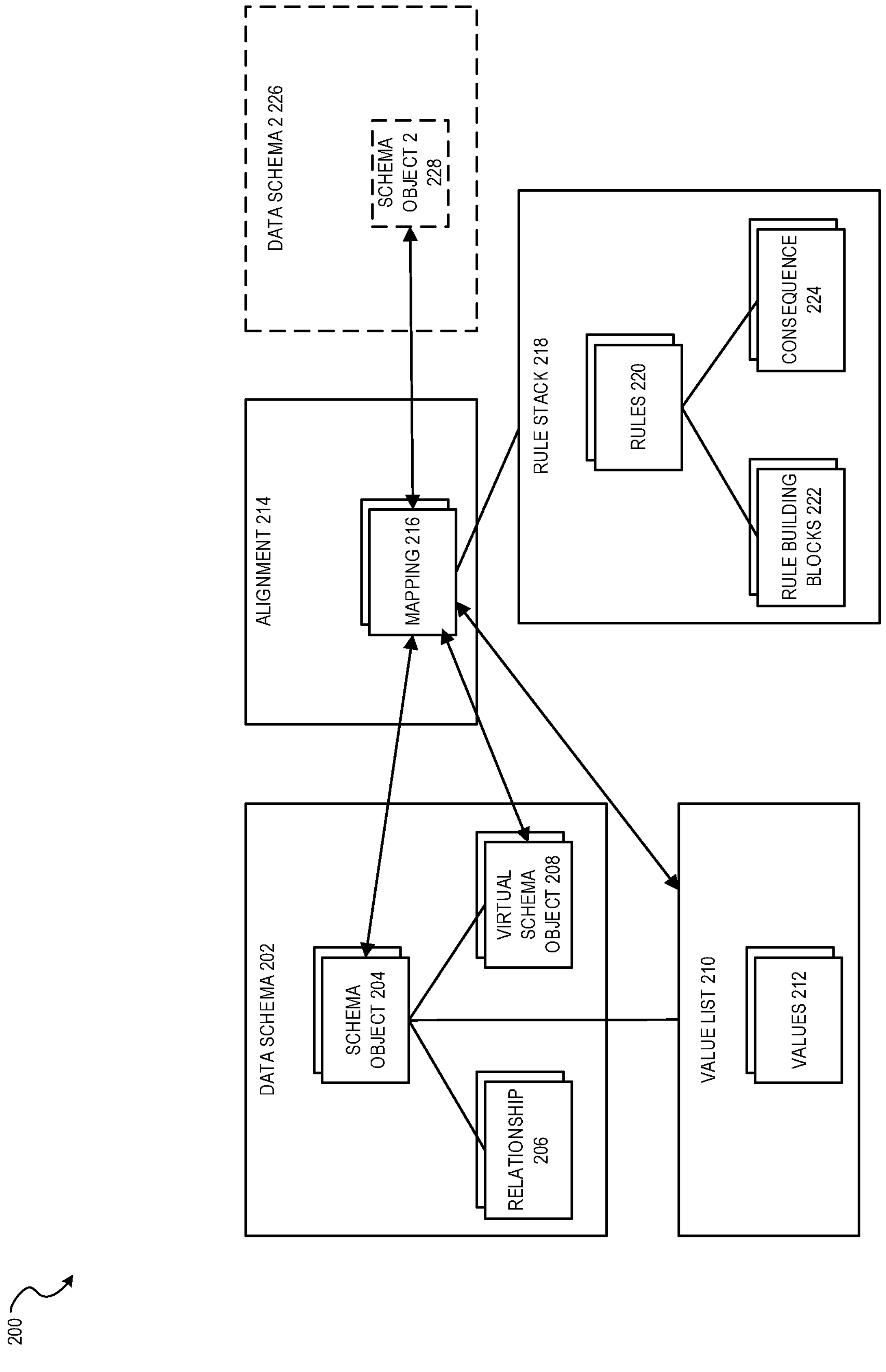
FIG. 2 depicts a matching metastructure definition, in accordance with an example embodiment.

FIG. 2 depicts a matching metastructure definition 200, in accordance with an example embodiment. The matching metastructure may be persisted, and may be stored as, or converted to, a graph representation. The matching metastructure 200 may have one or more data schemas 202, 226. A data schema object 202, 226 generally describes the structure in which data for a data model is held in the metastructure. For example, the structure may include information describing the technical (e.g. data type) and semantic (e.g., what the data means, how it is formatted, how it may be used, etc.) properties of data associated with the data model. A data schema 202, 226 may have multiple schema objects 204 (each of which may be instantiated one or more times), multiple relationship objects 206, or multiple virtual schema objects 208, or a combination thereof (including none).

A data schema 202, 226 may also have several properties. The data schema 202 may have an identifier property (e.g. DataSchemaID field or variable) for uniquely identifying the data schema. The data schema 202 may have a model identifier property (e.g. ModelID field or variable) for identifying the data model (e.g. file or database schema, which could be in the form of a URI) described by the data schema. The data schema 202 may have a type property (e.g. DataSchemaType field or variable) that indicates the type of data model represented in the data schema 202. Examples of different types are: a relational database schema, a conceptual data model, or an application program interface (API). The data schema 202 may have a version number property (e.g. Version field or variable) indicating the version of the data schema, which may be used in versioning as described herein. The data schema 202 may have a human-understandable description property (e.g. Name field or variable). The data schema 202 may have a publisher property (e.g. Publisher field or variable) indicating the creator or source of the data schema. In some embodiments, a data schema 202, 226 may have additional or alternative properties.

A schema object 204, 228 generally describes a structural component of a data model, or a structural component of a portion of a data model, represented by the data schema 202, 226. For example, a structural component for a database schema may be a table, or a column in a table, or a view, and so on. As another example, a structural component for an API may be a function call or an argument to a function call.

Generally, a data schema 202 has a schema object 204 for all structural components identified in the data model described by the data schema.

A schema object 204, 228 may also have several properties. The schema object 204 may have an identifier property (e.g. ObjectID field or variable) for uniquely identifying the schema object. The schema object 204 may have a component identifier property (e.g. ComponentID field or variable) for identifying the structural component (e.g. table in a database, column in a database table, function call in an API) described by the schema object. The schema object 204 may have a type property (e.g. ObjectType field or variable) that indicates the type of the structural component described by the schema object 204. Examples of different types are: a relational database table, a relational database attribute (e.g. column), a function in an API, or an interface parameter (e.g. argument to a function call in an API). The schema object 204 may have a human-understandable description property (e.g. Name field or variable). In some embodiments, a schema object 204 may have additional or alternative properties.

A schema object 204, 228 may reference a value list 210. A value list 210 may have, or enumerate, a set of values 212 that instances of the schema object 204 that references the value list may have. In some cases, the value list 210 may be a mutually exclusive set of values 212. Generally, a schema object 204, 228 associated with a value list 210 may only have the values 212 in the value list when instantiated. As an example, a schema object 204 describing a "date month" field may reference a value list 210 having values 212 "January," "February," "March," and so on. In some cases, a value list 210 may provide a range for values 212, instead of a discrete set of values. As an example, a schema object 204 describing a "date year" field may reference a value list 210 having a range of values 212 of 1900 to 2000.

A relationship object 206 generally describes a relationship between structural components represented by schema objects 204 of a data model represented by the data schema 202. For example, a relationship (e.g. an ontological relationship) between a database table and a column in the table may be that the column is an "attribute of" the table. As another example, a relationship between an API function and a variable for the function may be that the variable is an "argument of" the function. Generally, a relationship object 206 relates two schema objects 204 in a data schema 202 (e.g. the same data schema) and describes the relationship or association between the schema objects. This relationship may be expressed as R(O1, O2, T), where R is the relationship object, O1 is the first schema object, O2 is the second schema object, and T is the type of relationship between O1 and O2.

A relationship object 206 may also have several properties. The relationship object 206 may have an identifier property (e.g. RelationshipID field or variable) for uniquely identifying the relationship object. The relationship object 206 may have a first schema object identifier property (e.g. Object1ID field or variable) for identifying the first schema object 204 (e.g. table in a database, column in a database table, function call in an API) in the relationship. The relationship object 206 may have a second schema object identifier property (e.g. Object2ID field or variable) for identifying the second schema object 204 (e.g. table in a database, column in a database table, function call in an API) in the relationship. The relationship object 206 may have a type property (e.g. RelationshipType field or variable) that indicates the type of the relationship between the first and second schema objects 204. Examples of different types of relationships are: attribute of, foreign key of, argument of, component of. The relationship object 206 may have a human-understandable description property (e.g. Name field or variable). In some embodiments, a relationship object 206 may have additional or alternative properties.

As an example, a data schema S may describe a database data model or schema. The data schema S may have a schema object O1 describing a database table and a schema object O2 describing a column in the database table. Thus, a relationship object may be described as R(O1, O2, AttributeOfTable), where (O1, O2, ∊S) for which S.DataSchemaType="RelationalDatabaseSchema" and O1.ObjectType="Table" and O2.ObjectType="Attribute."

A virtual schema object 208 is generally similar to a schema object 204, having similar properties to a schema object. A virtual schema object 208 may describe a schema object 204 from which it is derived (or multiple schema objects), which in turn describes a structural component of a data model represented by the data schema 202. Further, a virtual schema object 208 is generally aware of the schema objects 204 from which it is derived. For example, a virtual schema object 208 may have a source schema object property (e.g. SourceSchemaObject1ID as a field or variable) which indicates a schema object (or multiple schema objects) from which it was derived. Example types of virtual schema objects are a calculation view in a relational database (e.g. view that calculates averages of data across several tables), a calculation view attribute in a relational database (e.g. a returned result for an average query of data across several tables), or a function in an API that calls multiple other functions available in the same API.

In some embodiments, a virtual schema object 208 may describe multiple schema objects 204, and so represent a composition or an aggregation of those schema objects (e.g. a virtual table that is formed from three schema objects 204 representing actual tables). Thus, a virtual schema object 208 may act as an assembling of multiple schema objects 204, which may be useful in mapping or aligning the data schema (e.g. 202) with another data schema (e.g. 226, such as when a single schema object 204 of the data schema 202 corresponds to multiple schema objects of the data schema 2 226, or vice versa). Virtual schema objects 208 may also be useful for developing a rule stack 218 for transforming one or more schema objects 204 to their mapped counterparts 228 in another data model 226. In some cases, a virtual schema object 208 may allow for development of a rule in a particular rule language (e.g. recursive rule language) where this cannot be done, or cannot easily be done, using the underlying schema objects 204 for the virtual schema object.

A virtual schema object 208 may allow for distinguishing between original schema objects 204 and schema objects that were developed or created later. Further, virtual schema objects 208 may be used to track or calculate statistics about alignments 214. For example, a virtual object 208 may be mapped to a schema object 228 in another data schema 226, but underlying schema objects for the virtual schema object may not be so mapped, or may not be explicitly mapped. The virtual schema object 208 may be useful to identify or track such scenarios for analysis.

The matching metastructure 200 may have one or more alignments 214. An alignment 214 generally describes or identifies equivalent structural components (e.g. semantically equivalent, structurally equivalent, data equivalent) between two data schemas, which generally describe separate data models. An alignment 214 may have multiple mapping objects 216 (including none). Each mapping object is a correspondence between two other objects. This may be expressed as A(DSS, DST, M), where A is the alignment, DSS is the first or source data schema, DST is the second or target data schema, and M is the set of one or more mapping objects (or, in some cases, zero or more mappings). Through the processes described in this document, the alignment may also connect a schema with a schema-independent value list or two schema-independent value lists.

An alignment 214 may also have several properties. The alignment 214 may have an identifier property (e.g. AlignmentID field or variable) for uniquely identifying the alignment. The alignment 214 may have a first data schema identifier property (e.g. DataSchema1ID field or variable) for identifying the first, or source, data schema 202 (e.g. data model). The alignment 214 may have a second, or target, data schema identifier property (e.g. DataSchema2ID field or variable) for identifying the second data schema 226 (e.g. data model) that is aligned or has been mapped to the first data schema. The alignment 214 may have a human-understandable description property (e.g. Name field or variable). The alignment 214 may have a version number property (e.g. Version field or variable) indicating the version of the alignment, which may be used in versioning as described herein. In some embodiments, an alignment 214 may have additional or alternative properties.

A mapping object 216 generally describes an equivalence between one or more structural components represented by schema objects 204 of a data model represented by the data schema 202 and one or more structural components represented by schema objects 2 228 of a second data model represented by the data schema 2 226. For example, a database table in a first data model may be mapped to a database table in a different data model because they are deemed to be semantically equivalent (or, in at least some cases, technically or structurally equivalent). Semantically equivalent structural components are structural components that have the same or approximately the same conceptual data, even if named, stored, or organized differently within the component. For example, a database table named "Users" with fields "name," "ID," and "permissions" may be semantically equivalent to a database table named "t453_1" with fields "a", "b," "c," and "d." In at least some cases, conceptual data can be equivalent even though the datatypes associated with the data (e.g., fields) are different between the data models, such as having a field A in a first model having a data type of integer and a field 1 in a second model having a data type of float.

A mapping object 216 may also have several properties. The mapping object 216 may have an identifier property (e.g. MappingID field or variable) for uniquely identifying the mapping object. The mapping object 216 may have a first schema object identifier property (e.g. Object1ID field or variable) for identifying the first, or source, schema object 204 (e.g. table in a database, column in a database table, function call in an API) in the mapping. In some cases, the first schema object identifier may be a set of multiple schema object identifiers from the source data schema (e.g. multiple schema objects in the source data schema map to a single schema object in the target schema). The mapping object 216 may have a second schema object identifier property (e.g. Object2ID field or variable) for identifying the second, or target, schema object 228 (e.g. table in a database, column in a database table, function call in an API) in the mapping. In some cases, the second schema object identifier may be a set of multiple schema object identifiers from the target data schema (e.g. multiple schema objects in the target data schema map to a single schema object in the source schema). The mapping object 216 may have a confidence property (e.g. Confidence field or variable) that indicates the strength or correctness of the mapping between the first and second schema objects 204, 228. The confidence property may be expressed as a percentage, a normalized score, or as another value, or, in some cases, a qualitative identifier (e.g., high, medium, low). The mapping object 216 may have a human-understandable description property (e.g. Name field or variable). In some embodiments, a mapping object 216 may have additional or alternative properties.

A mapping object 216 may reference a rule stack 218. A rule stack 218 may be a set of one or more, optionally ordered, rules 220 composed of rule building blocks 222 and having consequences 224. The rule stack 218 (and its components 220, 222, 224) may be recursive rule language rules, as described herein. Generally, a rule 220 is a first order logic expression that is built using the rule building blocks 222. A consequence 224 for a rule is an action (or actions) that is taken when the rule evaluates to true. A consequence 224 may specify a value that is to be written to a target schema object (e.g. schema object 2 228) in a target data schema (e.g. data schema 2 226).

Generally, a mapping object 216 defines equivalent schema objects 204, 228 between separate data schemas 202, 226. Generally, a rule stack 218 describes how to translate data from the source schema object 204 to the target schema object 228, such as identified in the mapping object. Generally, a rule stack 218 for a mapping object 216 only uses schema objects 204, 228 from the data schemas 202, 226 used in the alignment 214 with which the mapping object is associated.

The data objects (e.g. data schema 202, schema objects 204, etc.) in the matching metastructure 200 may be implemented as datatypes for various implementations, such as tables, classes, attributes, variables, and so on.

Figure 3:
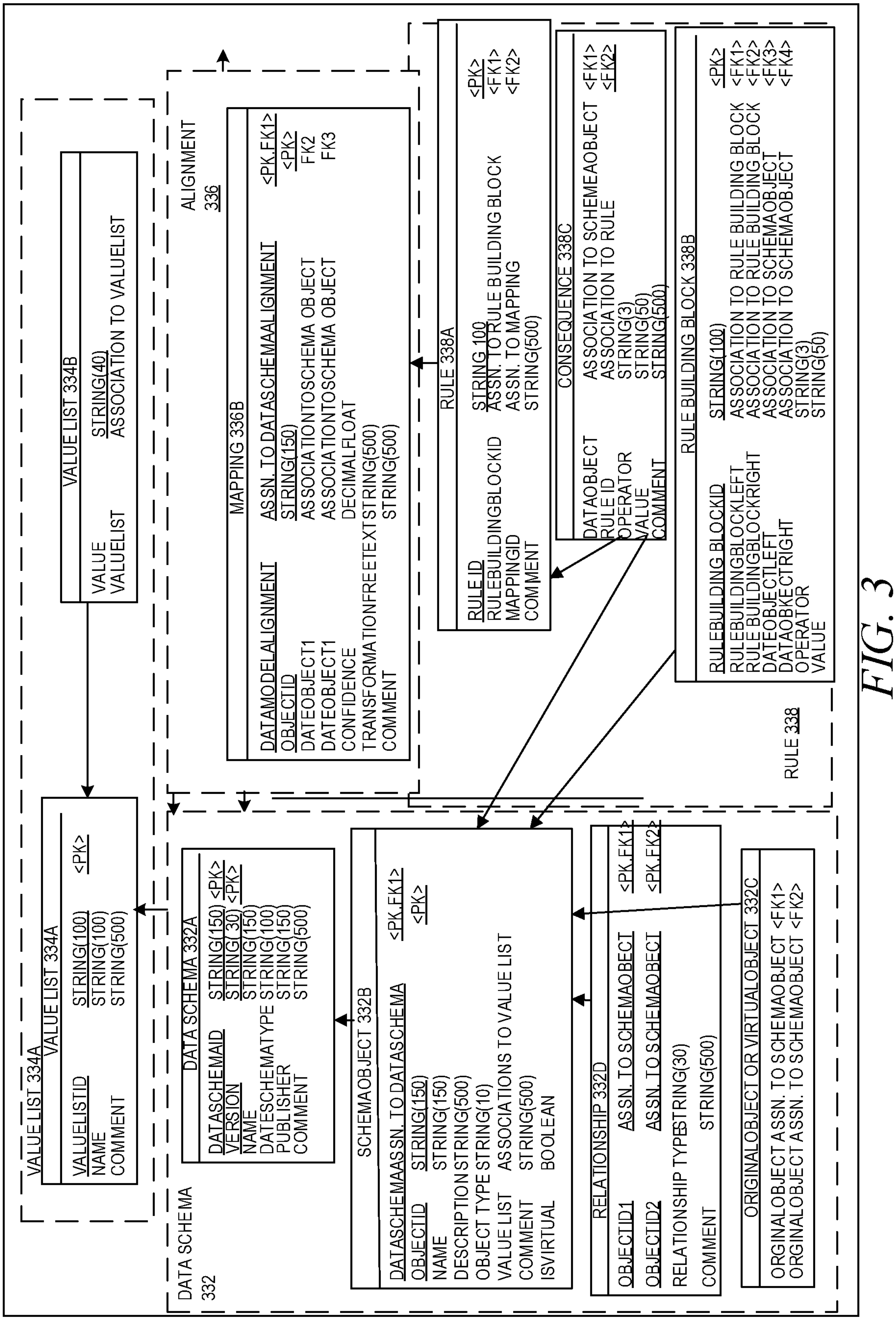
FIG. 3 depicts an example implementation of the matching metastructure as a database schema, in accordance with an example embodiment.

FIG. 3 depicts an example implementation of the matching metastructure as a database schema 330, in accordance with an example embodiment. The example matching metastructure database schema 330 may be a physical data model implemented in a database system, and may store the matching metastructure objects as rows in tables. The example database schema 330 may include a data schema 332 having a DataSchema table 332 a storing data schemas, a SchemaObject table **332*b* storing schema objects, an OriginalObjectsForVirtualObjects table 332*c* storing virtual schema objects, and a relationship table 332*d* storing relationship objects. The example database schema 330 may include value lists 334 having a ValueList table 334 a storing values lists and a Values table 334*b*** storing values for the value lists.

The example database schema 330 may include an alignment 336 having a DataSchemaAlignment table **333*a* storing alignments, and a Mapping table 336*b* storing mapping objects for the alignments. The example database schema 330 may include rules 338 having a Rule table 338 a storing rules for mapping transformations, a Rule Building Block table 338*b* storing rule building blocks for the rules, and a Consequence table 338*c*** storing consequences or results for the rules when triggered or satisfied.

Figure 4:
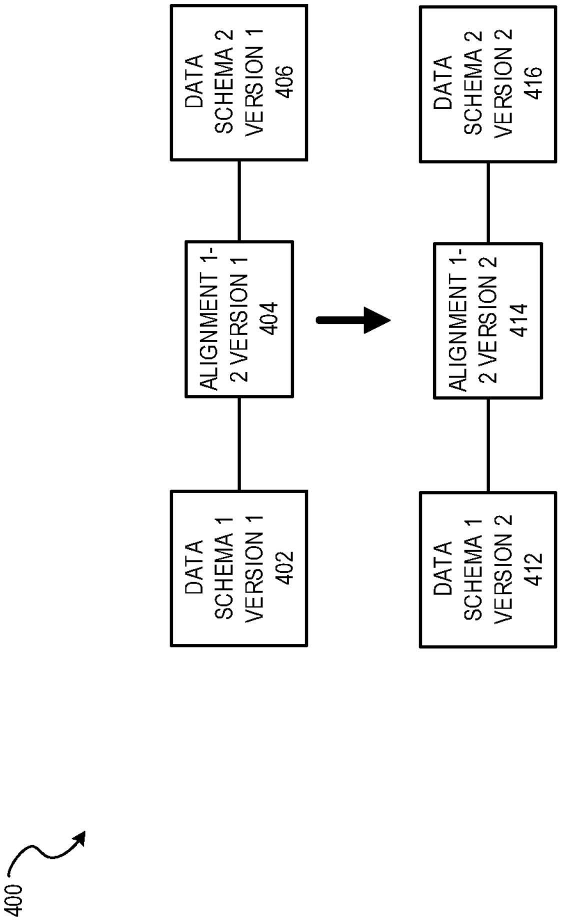
FIG. 4 depicts a version transformation example for a matching metastructure schema, in accordance with an example embodiment.

FIG. 4 depicts a version transformation example 400 for a matching metastructure schema, in accordance with an example embodiment. A data schema 1 402 may be version 1 and a data schema 2 406 may be version 1. An alignment 1-2 404 may align (e.g. map) the version 1 data schema 1 402 and the version 1 data schema 2 406. The alignment 1-2 404 may be version 1. Generally, during the lifecycle of the data schemas 402, 406 and the alignment 404, the same versions remain linked. Thus, a given version of a data schema (e.g. version 1 of data schema 1 402) links to a given version of an alignment (e.g. version 1 of alignment 1-2 404), which links to a given version of the second data schema (e.g. version 1 of the data schema 2 406).

Changes to any of the data schema 1 402, data schema 2 406, or the alignment 1-2 404 may prompt a version change (e.g. increase). Generally, the version change applies to all linked data schemas 402, 406 and alignments 404, regardless of whether that schema or alignment was changed. Thus, scenarios where no changes were made to the other linked data schemas or alignments still result in changes to their versions if the version changed for a linked data schema or alignment. For example, if Data Schema 2 changes from version 1 406 to version 2 416, both data schema 1 and alignment 1-2 will change from version 1 402, 404 to version 2 412, 414 even if neither data schema 1 nor alignment 1-2 changed. Thus, if one or more of the data schema 1 402, data schema 2 406, or the alignment 1-2 404 changes, all 402, 404, 406 will have their versions increased (even if that particular data schema or alignment did not, itself, change), becoming version 2 of data schema 1 412 linked to version 2 of alignment 1-2 414 linked to version 2 of data schema 2 416.

Increasing a version may include creating copies of the appropriate data schemas 402, 406 and alignment 404 and increasing their version numbers, resulting in data schemas 412, 416 and alignment 414. Increasing a version may also include changing one or more properties or objects of the data schemas or alignment 402, 404, and 406. Increasing a version may include re-mapping the data schemas 402, 406, which may be done through an automatic or semi-automatic process.

Generally, by maintaining consistent versions of linked data schemas and alignments, the full lifecycle management of the matching metastructure may be more accurately maintained and performed.

In an example embodiment, schema nodes are extended to value lists, with two lifecycle options: schema-dependent value lists and schema-independent value lists.

Figure 5:
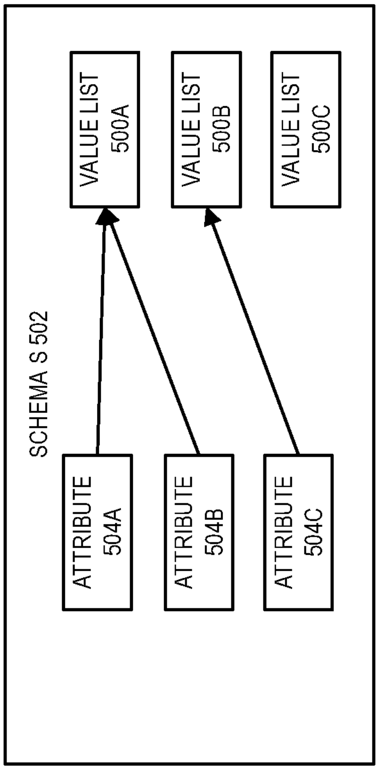
FIG. 5 is a block diagram illustrating schema-dependent value lists in accordance with an example embodiment.

A schema-dependent value list is hard-linked to a schema S, which is versioned. Those lists can only be used in the context of S, i.e., only attributes A c S can reference the list. They are versioned with S—if S is updated, the value list is automatically updated. FIG. 5 is a block diagram illustrating schema-dependent value lists 500A, 500B, 500C, in accordance with an example embodiment. Here, as can be seen, value lists 500A, 500B, 500C are tied directly to schema S 502. Thus, while value list 500A has attributes 504A, 504B and value list 500B has attribute 504C, all of these are tied directly to Schema S. Additionally, there is no HAS_VALUE_LIST attribute for any of value lists 500A, 500B, 500C since the value lists 500A, 500B, 500C cannot belong to any other schema.

Figure 6:
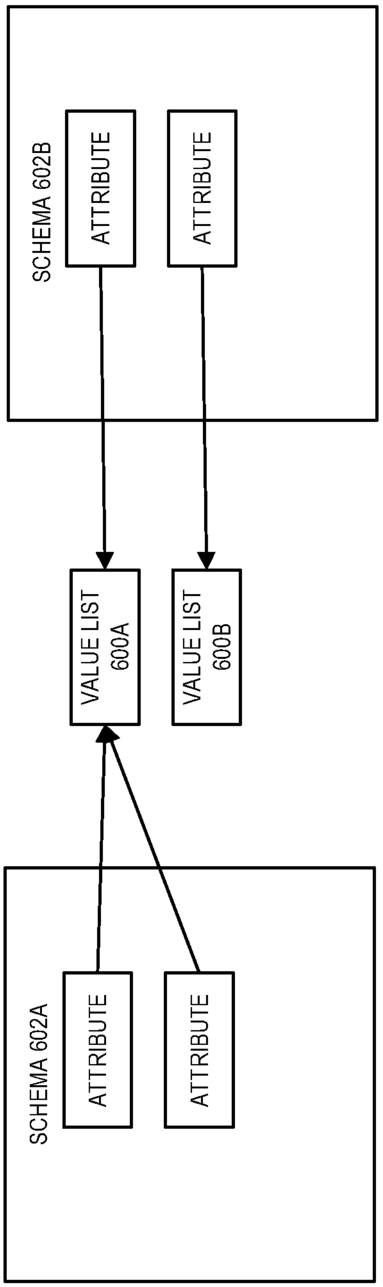
FIG. 6 is a block diagram illustrating schema-independent value lists in accordance with an example embodiment.

In contrast, a schema-independent value is not linked to a schema S and can be versioned independently of any schema. FIG. 6 is a block diagram illustrating schema-independent value lists 600A, 600B, in accordance with an example embodiment. Here, as can be seen, value lists 600A and 600B are tried to multiple schemas 602A, 602B. While value lists 600A and 600B are versioned independently of the schemas 602A, 602B, they may be used inside or outside of the context of the schemas 602A, 602B.

Figure 7:
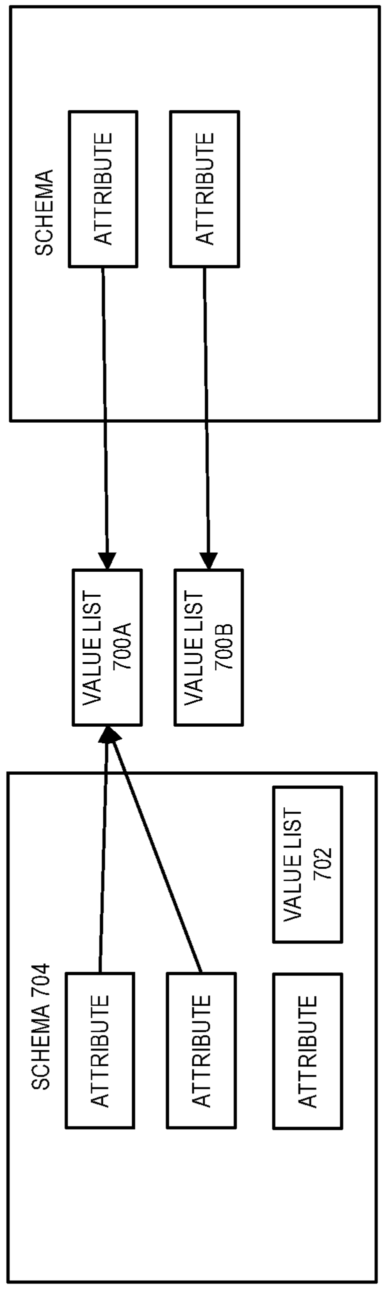
FIG. 7 is a block diagram illustrating the use of schema-independent value lists and schema-dependent value list by a single schema at the same time, in accordance with an example embodiment.

Indeed, schema-independent and schema-dependent value lists can be used by the same schema at the same time. FIG. 7 is a block diagram illustrating the use of schema-independent value lists 700A, 700B and schema-dependent value list 702 by a single schema 704 at the same time, in accordance with an example embodiment.

Like any schema node, a value list node can be mapped (appear in a correspondence). Similarly, value nodes can also be mapped. Furthermore, schema-independent value lists can be mapped on their own. For example, it is possible to create an alignment between two value lists.

Figure 8:
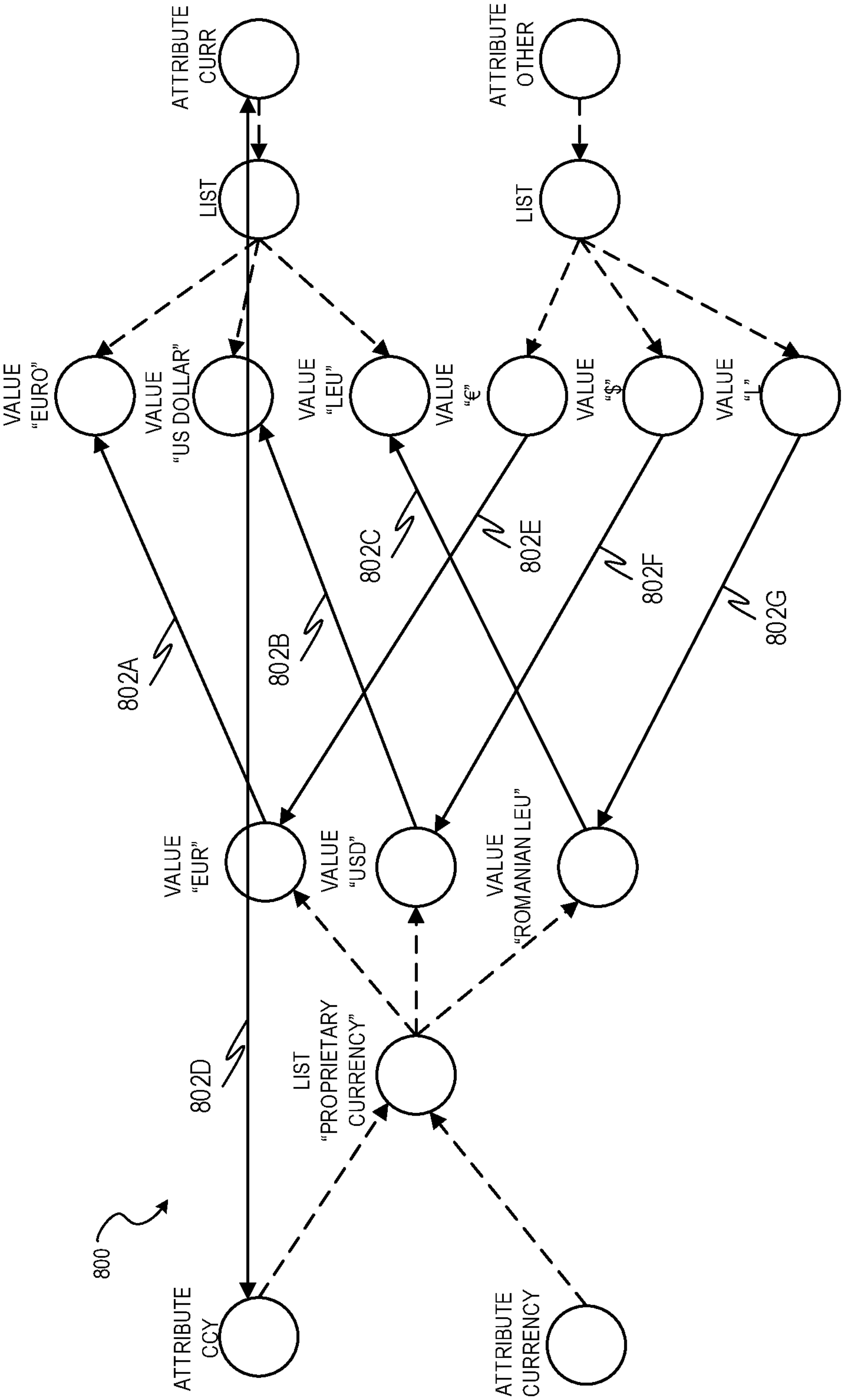
FIG. 8 is a block diagram illustrating an example of an alignment in accordance with an example embodiment.

FIG. 8 is a block diagram illustrating an example of an alignment 800 in accordance with an example embodiment. Here, the alignment contains seven correspondences 802A, 802B, 802C, 802D, 802E, 802F, and 802G. Note that in a user interface, an interesting subset can be selected for display to reduce complexity for the user. In this case, the interesting subset may be value mappings between attribute CCY 804 and attribute CURR 806, which may include correspondences 802A, 802B, 802C, and 802D but not correspondences 802E, 802F, and 802G.

Note that values are not being mapped directly but values are by design attached for list. This allows for easy reuse, as values never have to be matched twice.

It should also be noted that, in an example embodiment, an alignment may be opened up to be versioned and only hold between exactly two schema or schema-independent value list versions. This allows alignments between a schema and another schema, between a schema and a schema-independent value list, and between schema-independent value lists.

The mapping tool is responsible for data persistence and access. It manages the three core data objects (schemas, value lists, and alignments). Access is achieved through APIs and user interfaces. The mapping tool orchestrates various visibilities. In a multi-tenant system, users see only their own data. Algorithms, however, may have access to all tenants' data. These algorithms do not expose the data directly, but use them to provide value for all customers of the mapping tool. A tenant may set a schema, alignment, or value list to public access and thereby provide access to all tenants. A tenant may also offer a subscription/purchasing option for its data and share it only with customers Besides the data access and user interface functionality, the mapping tool also provides advanced algorithmic services for automatic or semi-automatic matching using machine learning, and more particularly a machine-learned model.

The goal of the machine learning is to provide a machine-learned model that finds correspondences between value lists and their values and directly adds them to a current alignment (or, at least, proposes their addition to a user via a user interface). More particularly, there may be two smart matching services offered: one for the value list, and one for the values. These may be called by the mapping tool within the overall match function, such as match(Schema s1 Schema s2)→Alignment.

The machine learned model may follow a five step process for the automated value list matching. This may include: 1. Local Value List Alignment Search, 2. Value Overlap Determination, 3. Anchoring of Lists in the Local Space and Ranking, 4. Global Value list Alignment Search, and 5. Anchoring of Local Lists in the Global Space and Ranking. The later steps are only performed for elements not yet matched in previous steps. The In the Local Value List Alignment Search, the system checks the local tenant correspondences to determine whether two lists have already been matched. This works for schema-independent and schema-dependent value lists. The version and mapping direction does not matter here. A correspondence is added if the lists were matched in a previous service or with an interchanged source/target. Additionally, the system does not stop early (e.g., once a match is found), as one list may have multiple matches in a correspondence.

In Value Overlap Determination, for the not yet matched nodes, the system looks to see whether there is significant overlap in the values of the lists that are to be matched. This is performed to identify identical or nearly identical lists. If the overlap exceeds some threshold value, then a match is created. The threshold may itself be learned by a machine learning algorithm, which iterates among various thresholds, testing training data against the value for the threshold, and evaluating a loss function at each iteration, until the loss function is minimized, at which stage the threshold for that minimum loss function is taken as the learned value. The machine learned model may then be retrained at a later stage, altering the threshold, based on new training data and/or user feedback. In an example embodiment, the overlap itself is calculated using a Jacard index.

Figure 9:
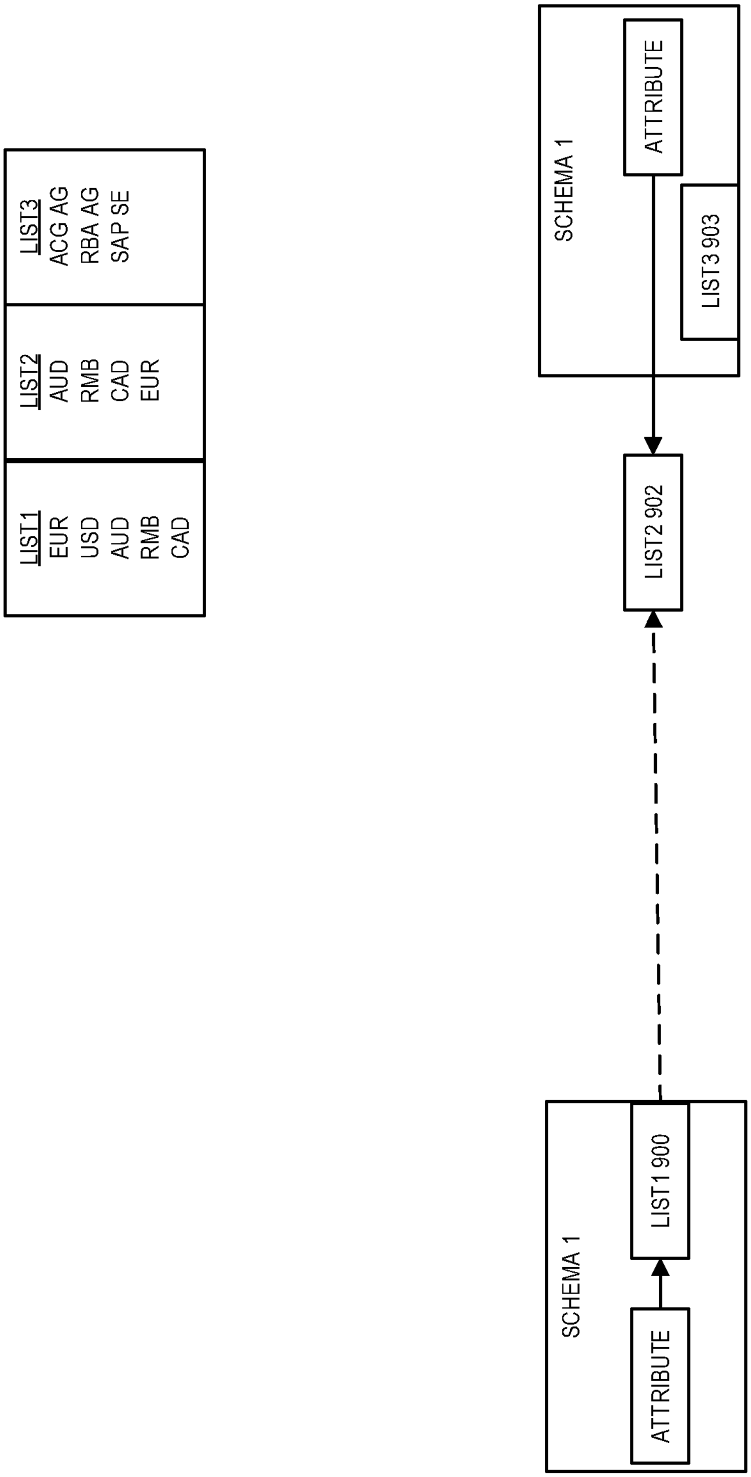
FIG. 9 is a block diagram illustrating value overlap determination in accordance with an example embodiment.

FIG. 9 is a block diagram illustrating value overlap determination in accordance with an example embodiment. Here, schema-dependent list 1 900 belongs to schema 1 902, while schema-independent list 2 904 and schema-dependent list 3 906 belong to schema 2 908. Schema-dependent list 1 900 and schema-independent list 2 904 share 4 out of 5 values. If the threshold is set at 0.75, then this is deemed to be a match because the Jacard index is ⅘ or 0.8, which is higher than 0.75. Thus, a correspondence is created between schema-dependent list 1 900 and schema-independent list 2 904

In the anchoring of lists in the local space and ranking, the not-yet mapped lists are linked in the local tenant space by applying the overlap function used in the Value Overlap Determination. This is a fuzzy linking mechanism resulting in many links. Candidates are saved for each list node not yet matched. By exploiting the tenant correspondences, the system can calculate a match score in a pair-wise fashion (lists of schema 1 in a Cartesian product with lists of schema 2). The best match or matches above a threshold can be added to the final alignment. This threshold can also be learned via a (separate) machine learning process, similar to the earlier threshold. The following is pseudocode for the anchoring of lists in the local space and ranking:

```
FOR l1 IN lists1:
  IF isAlreadyMatched(l1):
    CONTINUE
  result = new List<Pair<node, score>>
  FOR l2 in lists2:
    result.add(l2, getScore(l1, l2))
  RETURN IN DESCENDING ORDER result
METHOD getScore(l1, l2):
  Map<node, overlap_score> links1 = localTenant.getLinks( )
  Map<node, overlap_score> links2 = localTenant.getLinks( )
  score = 0
  FOR link1, score1 IN links1:
    FOR link2, score2 IN links2:
      IF localTenant.isCorrespondence(link1, link2)
        score += score1 + score2
  RETURN score
```

Figure 10:
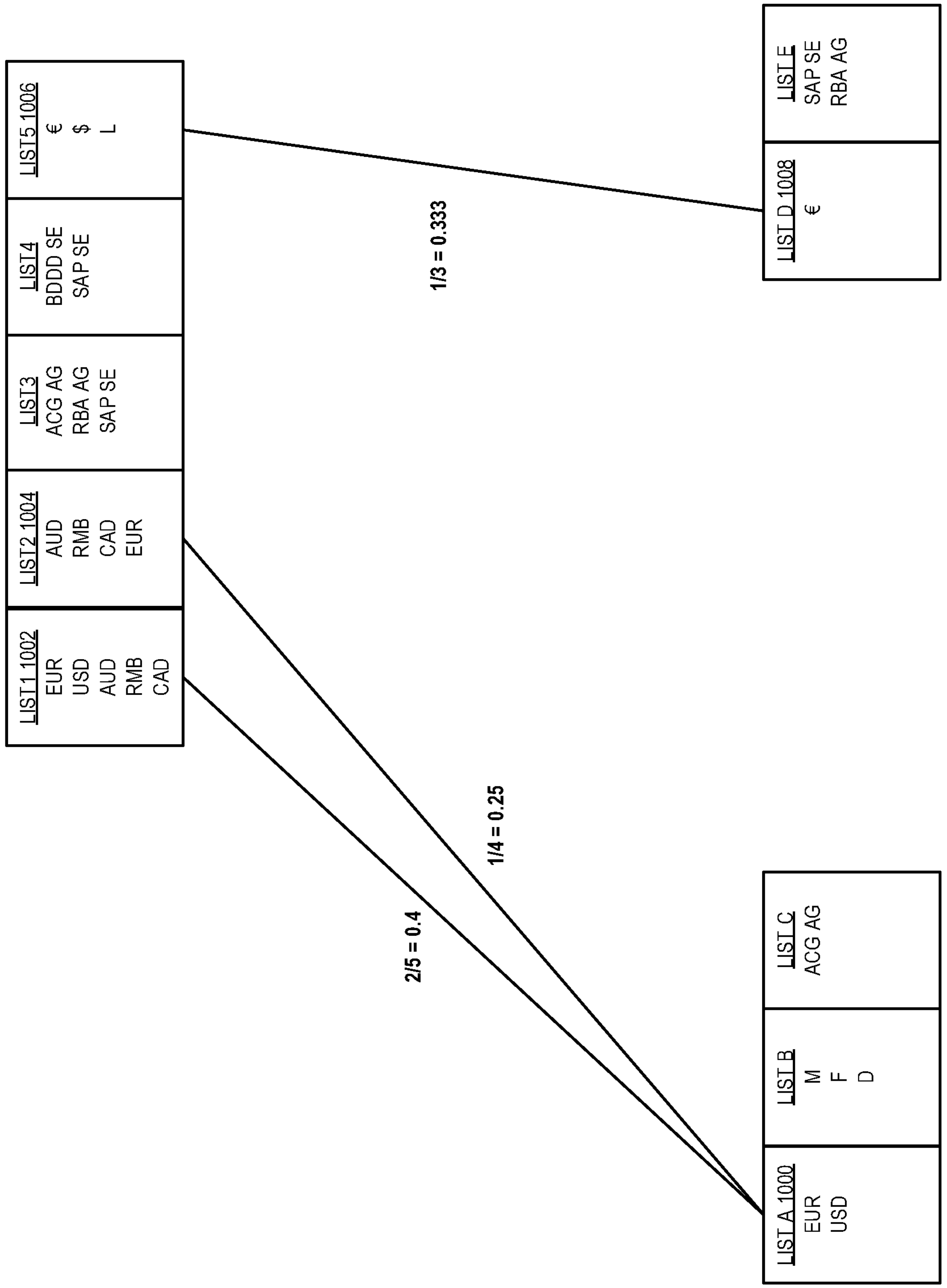
FIG. 10 is a block diagram illustrating anchoring of lists in the local space and ranking in accordance with an example embodiment.

FIG. 10 is a block diagram illustrating anchoring of lists in the local space and ranking in accordance with an example embodiment. Here, list A 1000 matches 2 out of 5 values with list 1 1002, list A 1000 matches 1 out of 4 values with list 2 1004, and list 5 1006 matches 1 out of three elements with list D 1008. Thus, when evaluating the possible matching of List A 1000 to List D, each of the possible paths to List D 1008 may be traversed, with each match score counted and factored into a final score. Assuming no weighting for any of the paths, this results in a match score of 0.4+0.333+0.25+0.333=1.316. This score may be normalized, such as to a range between 0 and 1. Additionally, in an example embodiment, the paths may be weighted, such as based on how many hops there are in the path between the two endpoints. These weights may also be learned via a machine learning process, as with the earlier thresholds.

For global value list alignment search, for target lists not yet matched, cross-tenant matches are examined. This is done to improve performance, but recognizing that trust is higher for local (non-cross-tenant) data. The pseudocode for this step is as follows:

```
FOR l1 IN lists1:
  IF isAlreadyMatched(l1):
    CONTINUE
  FOR l2 IN lists2:
    IF globalCorrespondences.findIgnoreVersion(list1, list2)
      newCorrespondence(list1, list2)
```

Value matching, like value list matching, may have its own five-step process. Nodes of type VALUE_LIST have already been aligned (Appear in correspondences), sand thus only values need to be matched. These steps may includes: 1. Local Value Search Via List, 2. Global Value Search Via List, 3. Local Value Linking and Scoring, 4. Global Value Linking and Scoring, and 5. Identity Matching.

In Local Value search, one value is mapped to one value (not multiple), hence the result becomes a 1-1 list. This is performed via a filterToOneOneList procedure, which may apply a stable marriage algorithm to identify the list. In general, the following pseudo-code may be used:

```
FOR (l1,l2) IN alignment.getValueListCorrespondences( )
  List<Correspondences> clist =
localTenant.getCorrespondencesIgnoringVersion(l1, l2)
  List<String> values1 = l1.getValues( )
  List<String> values2 = l2.getValues( )
  Map<Pair<String, String>, Double> result
  FOR Correspondence c IN clist:
    FOR v1, v2 IN c.getValueCorrespondences:
      IF (v1 IN values1 AND v2 IN values2) OR
        (v1 IN values2 AND v2 in values1):
        result. putOrIncrementScoreIfExsits(v1, v2)
  result = filterToOneOneList(result)
  FOR pair, score IN RESULT:
    IF score > threshold:
      newCorrespondence(pair)
```

Figure 11:
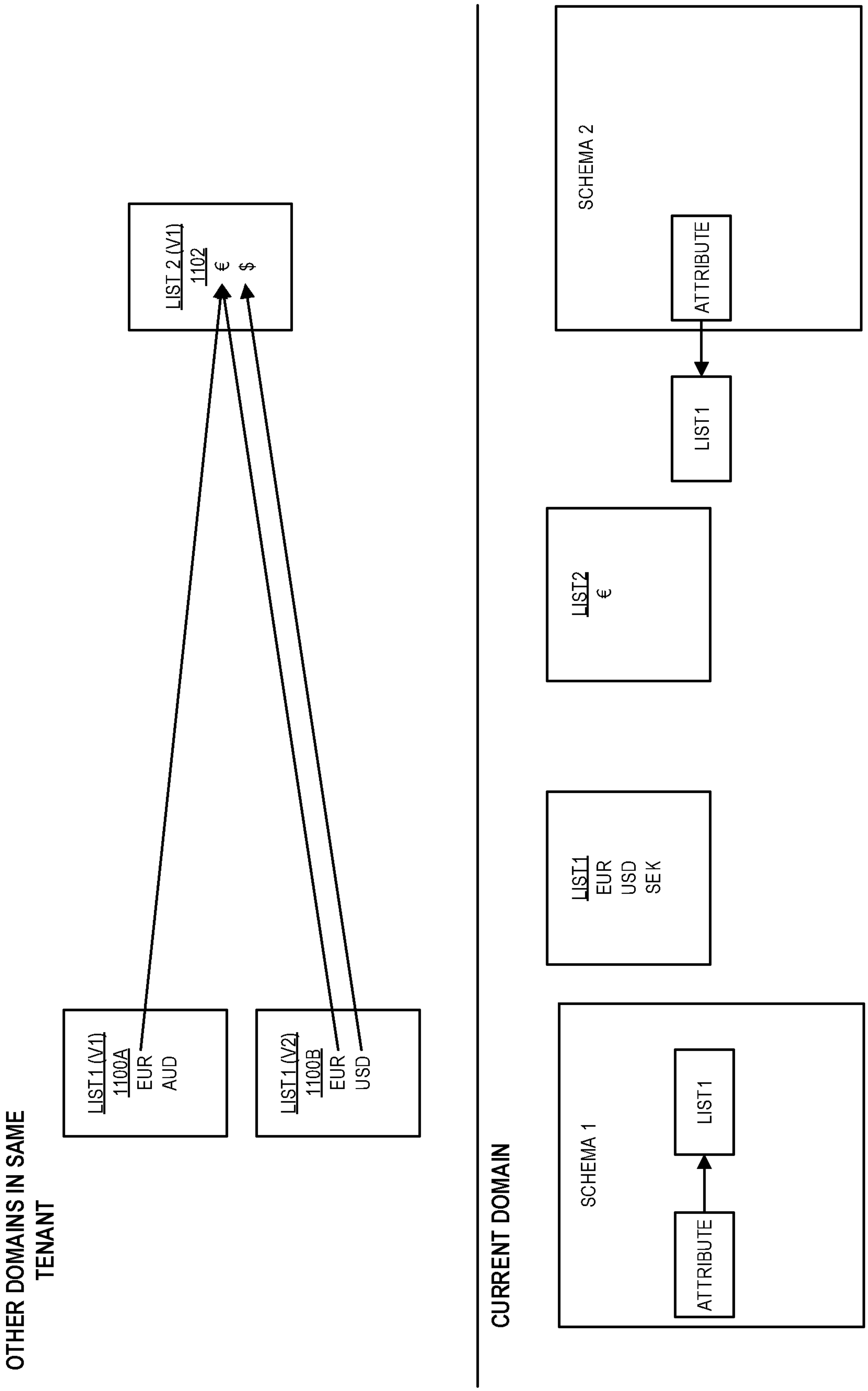
FIG. 11 is a diagram illustrating local value search via list, in accordance with an example embodiment.

FIG. 11 is a diagram illustrating local value search via list, in accordance with an example embodiment. Here, a first version 1100A of list 1 contains EUR and AUD while a second version 1100B of list 1 contains EUR and USD. Both the first version 1100A and the second version 1100B have correspondences to list 2 1102, but these correspondences may have been made by a different division or portion of the organization than one is attempting to make for list 1104 and list 1106. The local value search may identify that correspondences between EUR and € exist twice in that other division, while other correspondences, such as the correspondence between USD and $, only exists once. Thus, there is more evidence that EUR and € are matching and, assuming this evidence is a score that exceeds a particular threshold, that correspondence may be made between list 1104 and list 1106.

Global Value Search via List is identical to Local Value Search Via List, but performed only on values not yet matched and applied to the global tenant space.

Local Value Linking and scoring is performed on values not yet matched. For all value correspondences in the local tenant, it counts how often values were matched independently of the list. The best value matches that exceed a threshold are added to the alignment. The threshold, like the previous thresholds, may be machine learned.

Figure 12:
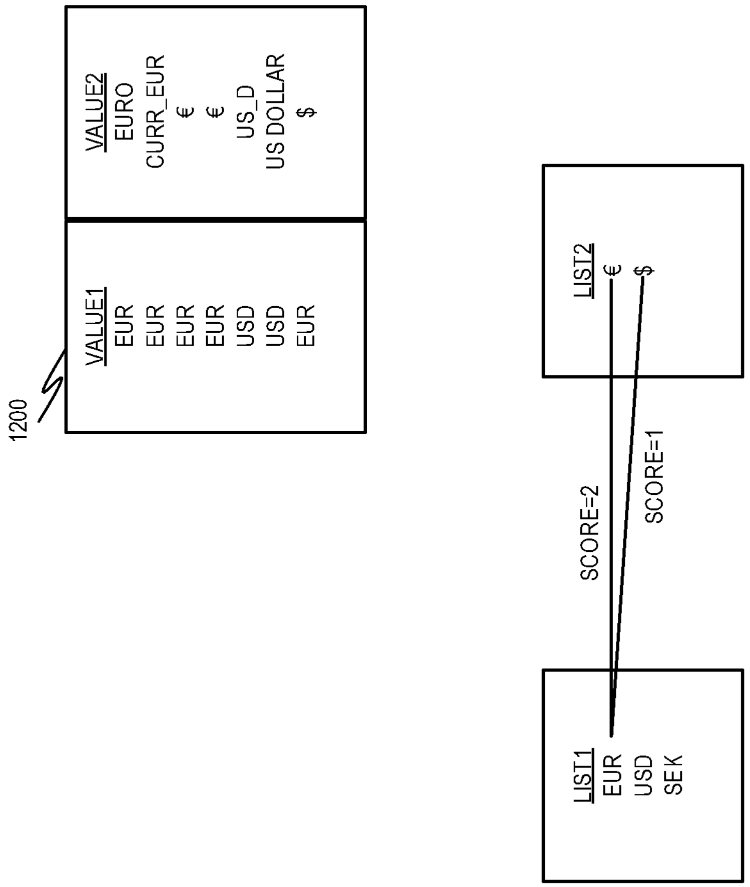
FIG. 12 is a diagram illustrating local value linking and scoring, in accordance with an example embodiment.

FIG. 12 is a diagram illustrating local value linking and scoring, in accordance with an example embodiment. Here, all value correspondences independent of the list are merged into record 1200. In this record, there is more evidence for EUR→€ than any other correspondence, hence it is added to the alignment (assuming that its number of matches exceed the threshold).

Pseudocode for this step is:

```
FOR (l1, l2) IN alignment.getValueListCorrespondences( ):
  List<String> values1 = l1.getValues( )
  List<String> values2 = l2.getValues( )
  Map<Pair<String, String>, Double> result
  FOR v1 IN values1:
    FOR v2 IN values2: result.putOrIncrementScoreIfExsits(
    (v1, v2), localTenant.countCorrespondences(v1, v2)
      )
  result = filterToOneOneList(result)
  FOR pair, score IN result:
    IF score > threshold:
      newCorrespondence(pair)
```

Global Value Linking and Scoring is identical to Local Value Linking and scoring, except performed later and on the global tenant.

Finally, identity matching identifies equal strings in lists. If the same string appears in two lists, a correspondence is established.

Figure 13:
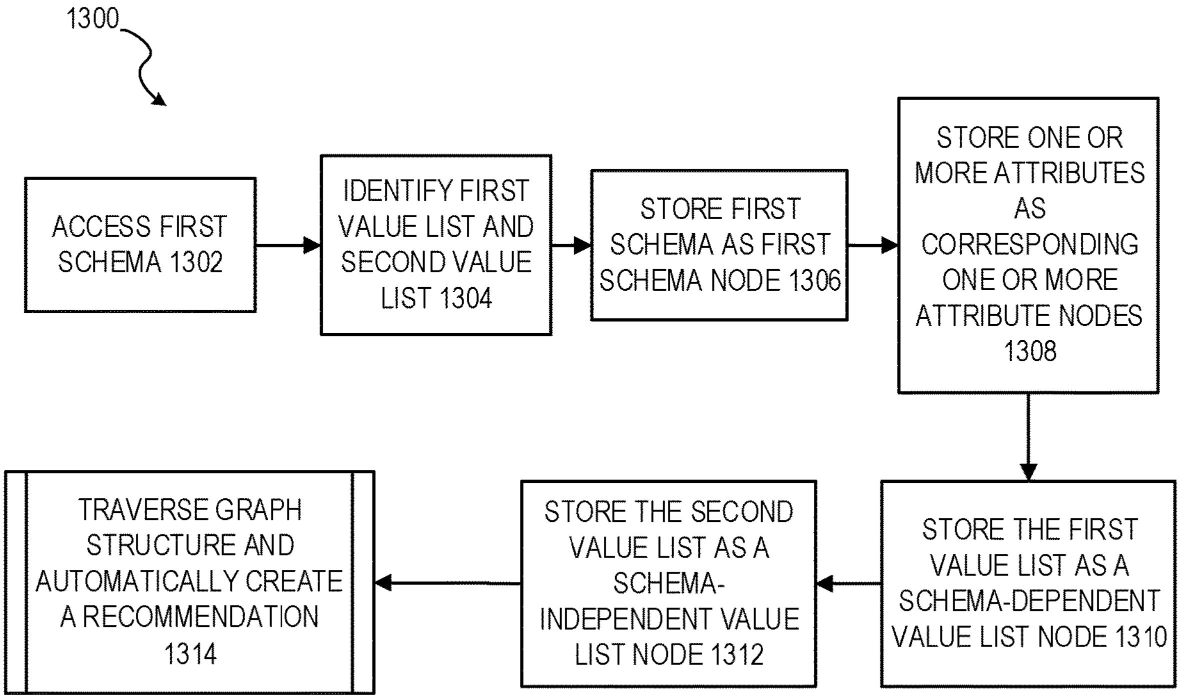
FIG. 13 is a flow diagram illustrating a method, in accordance with an example embodiment.

FIG. 13 is a flow diagram illustrating a method 1300, in accordance with an example embodiment. At operation 1302, a first schema of a database is accessed. The first schema has a version, one or more attributes, and defines a set of integrity constraints on how data is organized in the database. At operation 1304, a first value list and a second value list are identified, each being a set of values. At operation 1306, the first schema is stored as a first schema node in a graph structure. The graph structure may be stored in a triple store. At operation 1308, the one or more attributes are stored as corresponding one or more attribute nodes in the graph structure.

At operation 1310, the first value list is stored as a schema-dependent value list node in the graph structure. The schema-dependent value list node has an edge to a different value node for each value in the set of values in the first value list, the schema-dependent value list node being linked to the first schema node such that the schema-dependent value list node changes when the version of the first schema changes. At operation 1312, the second value list is stored as a schema-independent value list node in the graph structure. The schema-independent value list node has an edge to a different value node for each value in the set of values in the second value list, the schema-independent value list node having a version that is independent of the version of the first schema.

At operation 1314, the graph structure is traversed, and based on edges representing correspondences among nodes in the graph structure found during the traversal, a recommendation is automatically created for a first user in a first domain of a further correspondence to add to the graph structure.

Figure 14:
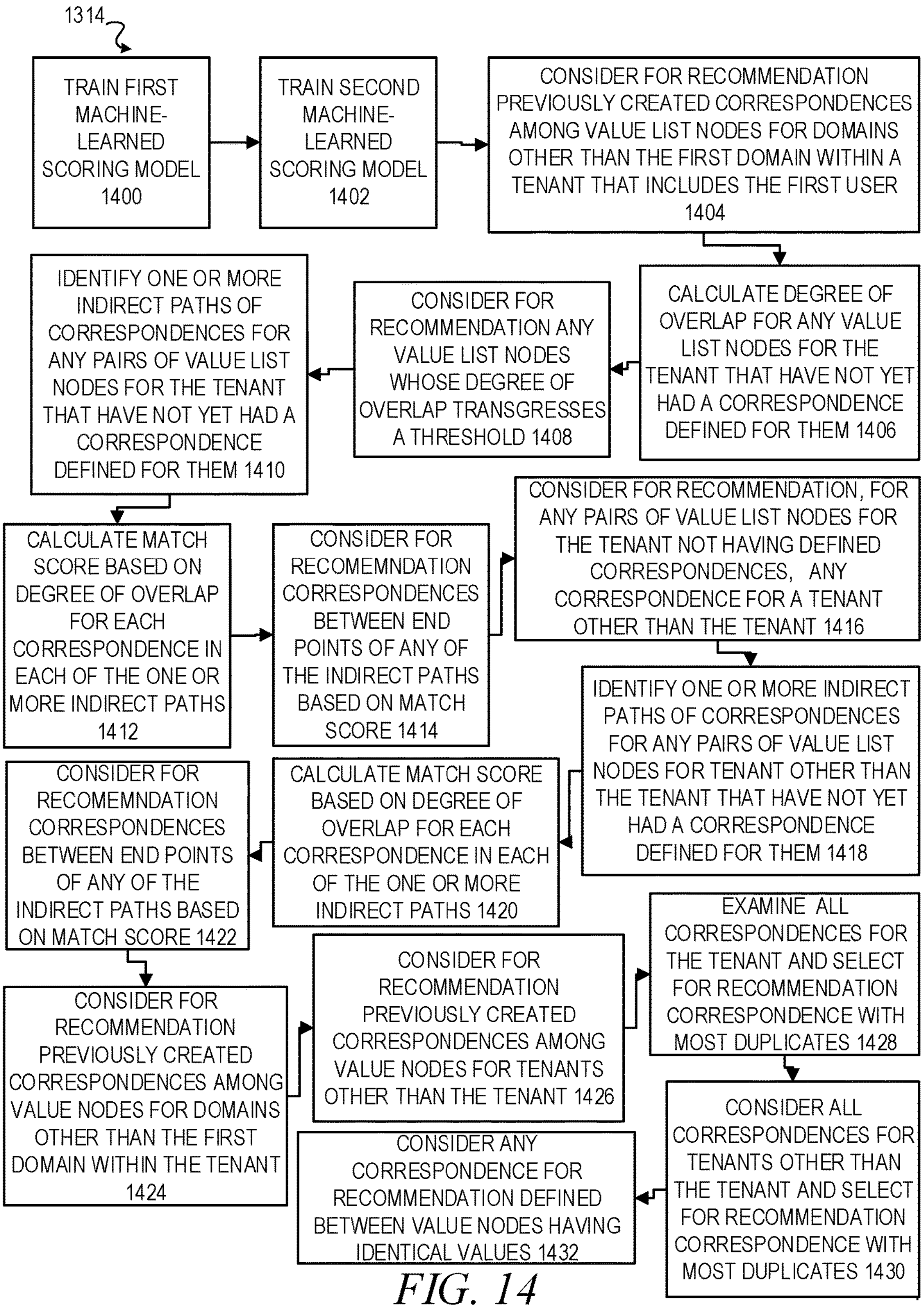
FIG. 14 is a flow diagram illustrating a method of traversing a graph structure to automatically create a recommendation in a accordance with an example embodiment.

FIG. 14 is a flow diagram illustrating a method 1314 of traversing a graph structure to automatically create a recommendation in a accordance with an example embodiment. FIG. 14 depicts operation 1314 of FIG. 13 in more detail.

At operation 1400, a first machine-learned scoring model is trained using labeled training data to learn a first value for a threshold indicative of whether a score for a particular potential match is considered a match. The first machine-learned scoring model will be used in identifying one or more matches among value list nodes in the graph structure. At operation 1402, a second machine-learned scoring model is trained using labeled training data to learn a second value for a threshold indicative of whether a score for a particular potential match is considered a match. The second machine-learned scoring model will be used in identifying one or more matches among value nodes in the graph structure.

Turning first to value list node matching, at operation 1404, previously created correspondences among value list nodes for domains other than the first domain within a tenant that includes the first user are checked for. At operation 1406, for any value list nodes for the tenant that includes the first user in the graph structure that have not yet had a correspondence defined for them, a degree of overlap between pairs of value list nodes is calculated. Degree of overlap is a measure of a number of values a pair of value list nodes share in common. At operation 1408, the degree of overlap is compared to the learned threshold. For any correspondence for whom the degree of overlap exceeds the threshold, the correspondence is considered for recommendation.

At operation 1410, for any pairs of value list nodes for the tenant that includes the first user in the graph structure that have not yet had a correspondence defined for them, one or more indirect paths of correspondences are identified between the corresponding value list nodes in the pair via other value list nodes. At operation 1412, a match score is calculated based on a degree of overlap for each correspondence in each of the one or more indirect paths. At operation 1414, a correspondence between value list nodes at the ends of any of these indirect paths of correspondence are considered for recommendation based on their match scores.

At operation 1416, for any value list nodes for the tenant that includes the first user in the graph structure that have not yet had a correspondence defined for them, previously created correspondences among value list nodes for tenants other than the tenant that includes the first user are checked for and, if found, considered for recommendation. At operation 1418, for any pairs of value list nodes for tenants other than the tenant that includes the first user in the graph structure that have not yet had a correspondence defined for them, one or more indirect paths of correspondences are identified between the corresponding value list nodes in the pair via other value list nodes. At operation 1420, a match score is calculated based on a degree of overlap for each correspondence in each of the one or more indirect paths. At operation 1422, a correspondence between value list nodes at the ends of any of these indirect paths of correspondence are considered for recommendation based on their match scores.

For determining matches between value nodes in the graph structure, at operation 1424, previously created correspondences among value nodes for domains other than the first domain within a tenant that includes the first user are identified and considered for recommendation. At operation 1426, for any value nodes for the tenant that includes the first user in the graph structure that have not yet had a correspondence defined for them, previously created correspondences among value nodes for tenants other than the tenant that includes the first user are checked for and considered for recommendation.

At operation 1428, for any value nodes for the tenant that includes the first user in the graph structure that have not yet had a correspondence defined for them, all correspondences in the tenant for domains other than the first domain and a correspondence having a most duplicates in the merge is considered for recommendation. At operation 1430, for any value nodes for the tenant that includes the first user in the graph structure that have not yet had a correspondence defined for them, all correspondences for tenants other than the tenant that includes the first user are merged and a correspondence having a most duplicates in the merge is considered for recommendation.

At operation 1432, for any value list nodes for the tenant that includes the first user in the graph structure that have not yet had a correspondence defined for them, any correspondences between value nodes having identical values are considered for recommendation.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:

at least one hardware processor; and a computer-readable medium storing instructions that, when executed by the at least one hardware processor, cause the at least one hardware processor to perform operations comprising:

accessing a first schema of a database, the first schema having a version, one or more attributes, and defining a set of integrity constraints on how data is organized in the database;

identifying a first value list and a second value list, each being a set of values;

storing the first schema as a first schema node in a graph structure;

storing the one or more attributes as corresponding one or more attribute nodes in the graph structure;

storing the first value list as a schema-dependent value list node in the graph structure, the schema-dependent value list node having an edge to a different value node for each value in the set of values in the first value list, the schema-dependent value list node being linked to the first schema node such that the schema-dependent value list node changes when the version of the first schema changes;

storing the second value list as a schema-independent value list node in the graph structure, the schema-independent value list node having an edge to a different value node for each value in the set of values in the second value list, the schema-independent value list node having a version that is independent of the version of the first schema; and traversing the graph structure, and based on edges representing correspondences among nodes in the graph structure found during the traversal, automatically creating a recommendation for a first user in a first domain of a further correspondence to add to the graph structure.

Example 2. The system of Example 1, wherein the graph structure is stored in a triple store.

Example 3. The system of Examples 1 or 2, wherein the automatically creating comprises:

identifying one or more matches between value lists represented as value list nodes in the graph data structure, the matching using a first machine-learned scoring model trained to output a score indicative of a degree of match for each of one or more combinations of value list nodes; and based on the scores output by the first machine-learned scoring model, recommending one or more correspondences to add to the graph structure.

Example 4. The system of Example 3, wherein the first machine-learned scoring model is trained using labeled training data to learn a value for a threshold indicative of whether a score for a particular potential match is considered a match.

Example 5. The system of Example 4, wherein the database is a multi-tenant database.

Example 6. The system of Example 5, wherein the identifying one or more matches comprises:

checking for previously created correspondences among value list nodes for domains other than the first domain within a tenant that includes the first user.

Example 7. The system of Example 6, wherein the identifying one or more matches further comprises:

for any value list nodes for the tenant that includes the first user in the graph structure that have not yet had a correspondence defined for them, calculating a degree of overlap between pairs of value list nodes, wherein degree of overlap is a measure of a number of values a pair of value list nodes share in common; and comparing the degree of overlap to the learned threshold.

Example 8. The system of Example 7, wherein the identifying one or more matches further comprises:

for any pairs of value list nodes for the tenant that includes the first user in the graph structure that have not yet had a correspondence defined for them, identifying one or more indirect paths of correspondences between the corresponding value list nodes in the pair via other value list nodes, and calculating a match score based on a degree of overlap for each correspondence in each of the one or more indirect paths.

Example 9. The system of Example 8, wherein the identifying one or more matches further comprises:

for any value list nodes for the tenant that includes the first user in the graph structure that have not yet had a correspondence defined for them, checking for previously created correspondences among value list nodes for tenants other than the tenant that includes the first user.

Example 10. The system of Example 9, wherein the identifying one or more matches further comprises:

for any pairs of value list nodes for tenants other than the tenant that includes the first user in the graph structure that have not yet had a correspondence defined for them, identifying one or more indirect paths of correspondences between the corresponding value list nodes in the pair via other value list nodes, and calculating a match score based on a degree of overlap for each correspondence in each of the one or more indirect paths.

Example 11. The system of any of Examples 1-10, wherein the automatically creating comprises:

identifying one or more matches between values represented as value nodes in the graph data structure, the matching using second first machine-learned scoring model trained to output a score indicative of a degree of match for each of one or more combinations of value nodes; and based on the scores output by the second machine-learned scoring model, recommending one or more correspondences to add to the graph structure.

Example 12. The system of Example 11, wherein the second machine-learned scoring model is trained using labeled training data to learn a value for a threshold indicative of whether a score for a particular potential match is considered a match.

Example 13. The system of Example 12, wherein the database is a multi-tenant database.

Example 14. The system of Example 13, wherein the identifying one or more matches comprises:

checking for previously created correspondences among value nodes for domains other than the first domain within a tenant that includes the first user.

Example 15. The system of Example 14, wherein the identifying one or more matches further comprises:

for any value nodes for the tenant that includes the first user in the graph structure that have not yet had a correspondence defined for them, checking for previously created correspondences among value nodes for tenants other than the tenant that includes the first user.

Example 16. The system of Example 15, wherein the identifying one or more matches further comprises:

for any value nodes for the tenant that includes the first user in the graph structure that have not yet had a correspondence defined for them, merging all correspondences in the tenant for domains other than the first domain and identifying a correspondence having a most duplicates in the merge.

Example 17. The system of Example 16, wherein the identifying one or more matches further comprises:

for any value nodes for the tenant that includes the first user in the graph structure that have not yet had a correspondence defined for them, merging all correspondences for tenants other than the tenant that includes the first user identifying a correspondence having a most duplicates in the merge.

Example 18. The system of Example 17, wherein the identifying one or more matches further comprises:

for any value list nodes for the tenant that includes the first user in the graph structure that have not yet had a correspondence defined for them, identifying any correspondences between value nodes having identical values.

Example 19. A method comprising:

accessing a first schema of a database, the first schema having a version, one or more attributes, and defining a set of integrity constraints on how data is organized in the database;

identifying a first value list and a second value list, each being a set of values;

storing the first schema as a first schema node in a graph structure;

storing the one or more attributes as corresponding one or more attribute nodes in the graph structure;

storing the first value list as a schema-dependent value list node in the graph structure, the schema-dependent value list node having an edge to a different value node for each value in the set of values in the first value list, the schema-dependent value list node being linked to the first schema node such that the schema-dependent value list node changes in response to the version of the first schema changing;

storing the second value list as a schema-independent value list node in the graph structure, the schema-independent value list node having an edge to a different value node for each value in the set of values in the second value list, the schema-independent value list node having a version that is independent of the version of the first schema; and traversing the graph structure, and based on edges representing correspondences among nodes in the graph structure found during the traversal, automatically creating a recommendation for a first user in a first domain of a further correspondence to add to the graph structure.

Example 20. A non-transitory machine-readable medium storing instructions which, when executed by one or more processors, cause the one or more processors to perform operations comprising:

accessing a first schema of a database, the first schema having a version, one or more attributes, and defining a set of integrity constraints on how data is organized in the database;

identifying a first value list and a second value list, each being a set of values;

storing the first schema as a first schema node in a graph structure;

storing the one or more attributes as corresponding one or more attribute nodes in the graph structure;

storing the first value list as a schema-dependent value list node in the graph structure, the schema-dependent value list node having an edge to a different value node for each value in the set of values in the first value list, the schema-dependent value list node being linked to the first schema node such that the schema-dependent value list node changes in response to the version of the first schema changing;

storing the second value list as a schema-independent value list node in the graph structure, the schema-independent value list node having an edge to a different value node for each value in the set of values in the second value list, the schema-independent value list node having a version that is independent of the version of the first schema; and traversing the graph structure, and based on edges representing correspondences among nodes in the graph structure found during the traversal, automatically creating a recommendation for a first user in a first domain of a further correspondence to add to the graph structure.

Figure 15:
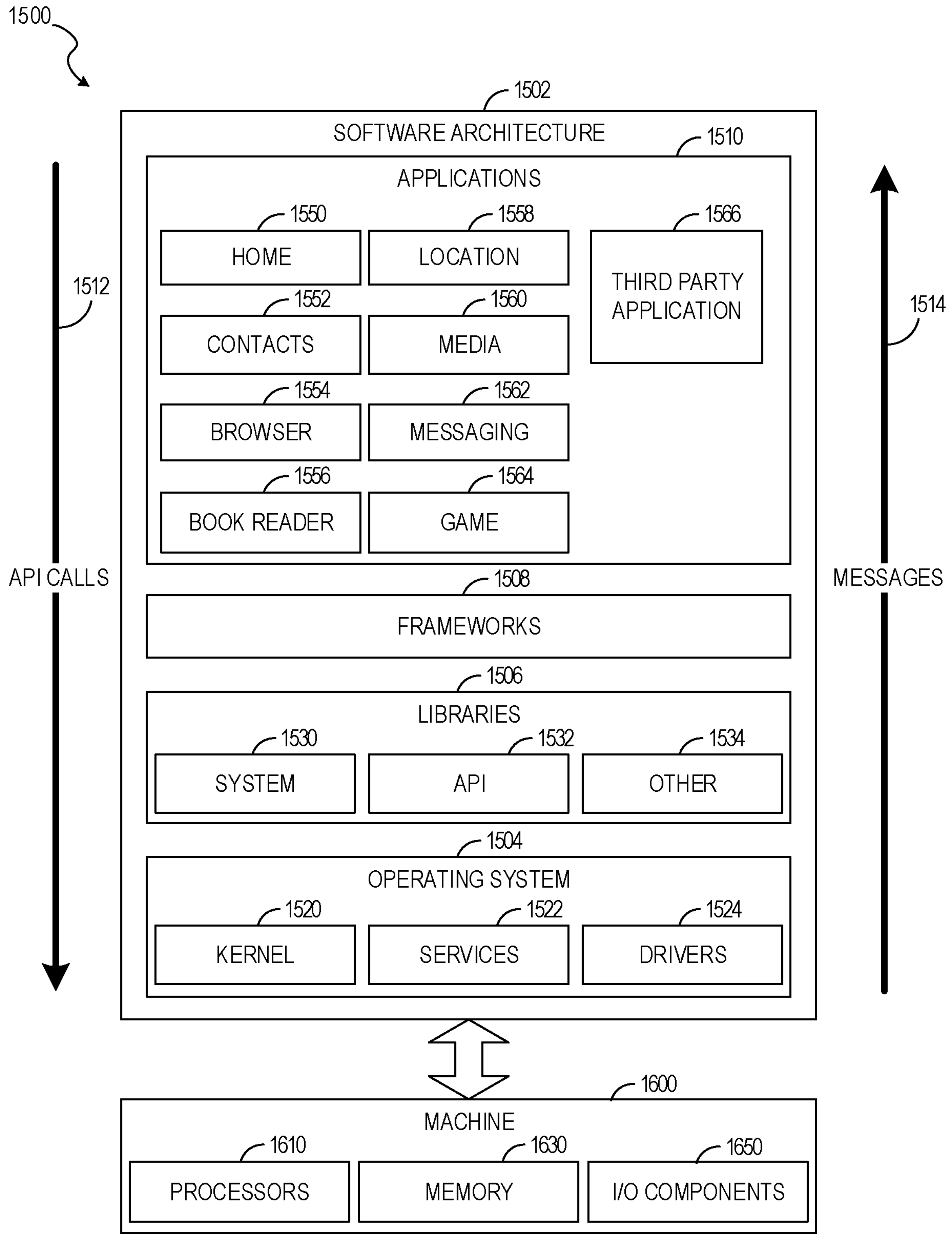
FIG. 15 is a block diagram illustrating a software architecture, which can be installed on any one or more of the devices described above.

FIG. 15 is a block diagram 1500 illustrating a software architecture 1502, which can be installed on any one or more of the devices described above. FIG. 15 is merely a non-limiting example of a software architecture, and it will be appreciated that many other architectures can be implemented to facilitate the functionality described herein. In various embodiments, the software architecture 1502 is implemented by hardware such as a machine 1600 of FIG. 16 that includes processors 1610, memory 1630, and input/output (I/O) components 1650. In this example architecture, the software architecture 1502 can be conceptualized as a stack of layers where each layer may provide a particular functionality. For example, the software architecture 1502 includes layers such as an operating system 1504, libraries 1506, frameworks 1508, and applications 1510. Operationally, the applications 1510 invoke Application Program Interface (API) calls 1512 through the software stack and receive messages 1514 in response to the API calls 1512, consistent with some embodiments.

In various implementations, the operating system 1504 manages hardware resources and provides common services. The operating system 1504 includes, for example, a kernel 1520, services 1522, and drivers 1524. The kernel 1520 acts as an abstraction layer between the hardware and the other software layers, consistent with some embodiments. For example, the kernel 1520 provides memory management, processor management (e.g., scheduling), component management, networking, and security settings, among other functionality. The services 1522 can provide other common services for the other software layers. The drivers 1524 are responsible for controlling or interfacing with the underlying hardware. For instance, the drivers 1524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1506 provide a low-level common infrastructure utilized by the applications 1510. The libraries 1506 can include system libraries 1530 (e.g., C standard library) that can provide functions such as memory allocation functions, string manipulation functions, mathematic functions, and the like. In addition, the libraries 1506 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1506 can also include a wide variety of other libraries 1534 to provide many other APIs to the applications 1510.

The frameworks 1508 provide a high-level common infrastructure that can be utilized by the applications 1510. For example, the frameworks 1508 provide various graphical user interface (GUI) functions, high-level resource management, high-level location services, and so forth. The frameworks 1508 can provide a broad spectrum of other APIs that can be utilized by the applications 1510, some of which may be specific to a particular operating system 1504 or platform.

In an example embodiment, the applications 1510 include a home application 1550, a contacts application 1552, a browser application 1554, a book reader application 1556, a location application 1558, a media application 1560, a messaging application 1562, a game application 1564, and a broad assortment of other applications, such as a third-party application 1566. The applications 1510 are programs that execute functions defined in the programs. Various programming languages can be employed to create one or more of the applications 1510, structured in a variety of manners, such as object-oriented programming languages (e.g., Objective-C, Java, or C++) or procedural programming languages (e.g., C or assembly language). In a specific example, the third-party application 1566 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1566 can invoke the API calls 1512 provided by the operating system 1504 to facilitate functionality described herein.

Figure 16:
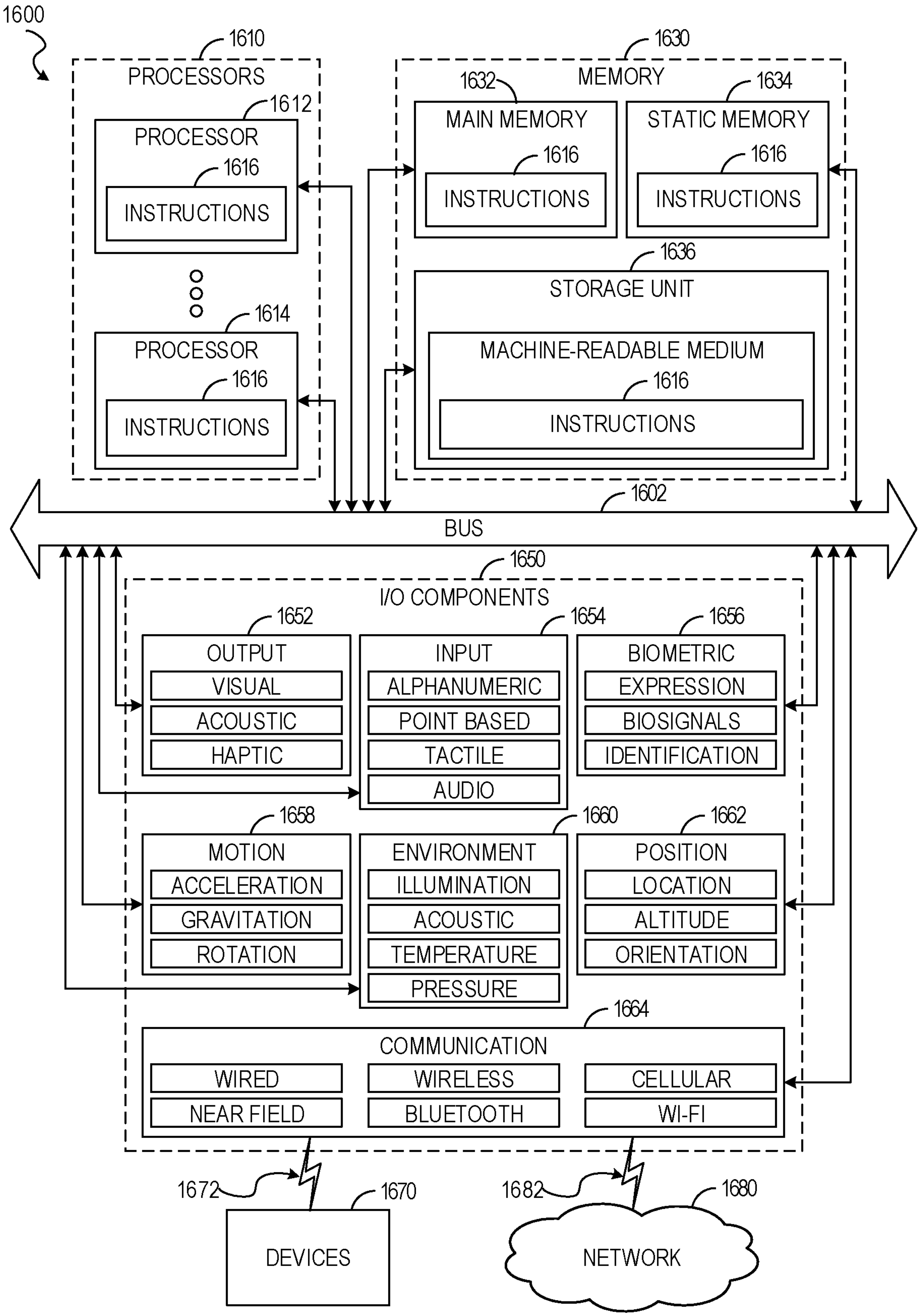
FIG. 16 illustrates a diagrammatic representation of a machine in the form of a computer system within which a set of instructions may be executed for causing the machine to perform any one or more of the methodologies discussed herein.

FIG. 16 illustrates a diagrammatic representation of a machine 1600 in the form of a computer system within which a set of instructions may be executed for causing the machine 1600 to perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions 1616 may cause the machine 1600 to execute the method of FIGS. 13 and 14. Additionally, or alternatively, the instructions 1616 may implement FIGS. 1-14 and so forth. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1612 and a processor 1614 that may execute the instructions 1616. The term "processor" is intended to include multi-core processors that may comprise two or more independent processors (sometimes referred to as "cores") that may execute instructions 1616 contemporaneously. Although FIG. 16 shows multiple processors 1610, the machine 1600 may include a single processor 1612 with a single core, a single processor 1612 with multiple cores (e.g., a multi-core processor 1612), multiple processors 1612, 1614 with a single core, multiple processors 1612, 1614 with multiple cores, or any combination thereof.

The memory 1630 may include a main memory 1632, a static memory 1634, and a storage unit 1636, each accessible to the processors 1610 such as via the bus 1602. The main memory 1632, the static memory 1634, and the storage unit 1636 store the instructions 1616 embodying any one or more of the methodologies or functions described herein. The instructions 1616 may also reside, completely or partially, within the main memory 1632, within the static memory 1634, within the storage unit 1636, within at least one of the processors 1610 (e.g., within the processor's cache memory), or any suitable combination thereof, during execution thereof by the machine 1600.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion, and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662, among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or another suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., coupled via a USB).

Moreover, the communication components 1664 may detect identifiers or include components operable to detect identifiers. For example, the communication components 1664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

The various memories (i.e., 1630, 1632, 1634, and/or memory of the processor(s) 1610) and/or the storage unit 1636 may store one or more sets of instructions 1616 and data structures (e.g., software) embodying or utilized by any one or more of the methodologies or functions described herein. These instructions (e.g., the instructions 1616), when executed by the processor(s) 1610, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., Hypertext Transfer Protocol (HTTP)). Similarly, the instructions 1616 may be transmitted or received using a transmission medium via the coupling 1672 (e.g., a peer-to-peer coupling) to the devices 1670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1616 for execution by the machine 1600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

accessing a first schema of a database, the first schema having a version, one or more attributes, and defining a set of integrity constraints on how data is organized in the database;

identifying a first value list and a second value list, each being a set of values;

storing the first schema as a first schema node in a graph structure, the graph structure stored in a data store other than the database;

storing the one or more attributes as corresponding one or more attribute nodes in the graph structure;

creating a schema-dependent value list node corresponding to the first value list in the graph structure;

creating an edge between the schema-dependent value list node and a different value node for each value in the set of values in the first value list, the schema-dependent value list node being linked to the first schema node such that the schema-dependent value list node changes in response to the version of the first schema changing;

creating a schema-independent value list node corresponding to the second value list in the graph structure;

creating an edge between the schema-independent value list node and a different value node for each value in the set of values in the second value list, the schema-independent value list node having a version that is independent of the version of the first schema; and traversing the graph structure, and based on edges representing correspondences among nodes in the graph structure found during the traversal, automatically creating a recommendation for a first user in a first domain of a further correspondence to add to the graph structure.

2. The system of claim 1, wherein the graph structure is stored in a triple store.

3. The system of claim 1, wherein the automatically creating comprises:

identifying one or more matches between value lists represented as value list nodes in the graph data structure, the matching using a first machine-learned scoring model trained to output a score indicative of a degree of match for each of one or more combinations of value list nodes; and based on the scores output by the first machine-learned scoring model, recommending one or more correspondences to add to the graph structure.

4. The system of claim 3, wherein the first machine-learned scoring model is trained using labeled training data to learn a value for a threshold indicative of whether a score for a particular potential match is considered a match.

5. The system of claim 4, wherein the database is a multi-tenant database.

6. The system of claim 5, wherein the identifying one or more matches comprises:

checking for previously created correspondences among value list nodes for domains other than the first domain within a tenant that includes the first user.

7. The system of claim 6, wherein the identifying one or more matches further comprises:

for any value list nodes for the tenant that includes the first user in the graph structure that have not yet had a correspondence defined for them, calculating a degree of overlap between pairs of value list nodes, wherein degree of overlap is a measure of a number of values a pair of value list nodes share in common; and comparing the degree of overlap to the learned threshold.

8. The system of claim 7, wherein the identifying one or more matches further comprises:

for any pairs of value list nodes for the tenant that includes the first user in the graph structure that have not yet had a correspondence defined for them, identifying one or more indirect paths of correspondences between the corresponding value list nodes in the pair via other value list nodes, and calculating a match score based on a degree of overlap for each correspondence in each of the one or more indirect paths.

9. The system of claim 8, wherein the identifying one or more matches further comprises:

for any value list nodes for the tenant that includes the first user in the graph structure that have not yet had a correspondence defined for them, checking for previously created correspondences among value list nodes for tenants other than the tenant that includes the first user.

10. The system of claim 9, wherein the identifying one or more matches further comprises:

for any pairs of value list nodes for tenants other than the tenant that includes the first user in the graph structure that have not yet had a correspondence defined for them, identifying one or more indirect paths of correspondences between the corresponding value list nodes in the pair via other value list nodes, and calculating a match score based on a degree of overlap for each correspondence in each of the one or more indirect paths.

11. The system of claim 1, wherein the automatically creating comprises:

identifying one or more matches between values represented as value nodes in the graph data structure, the matching using second first machine-learned scoring model trained to output a score indicative of a degree of match for each of one or more combinations of value nodes; and based on the scores output by the second machine-learned scoring model, recommending one or more correspondences to add to the graph structure.

12. The system of claim 11, wherein the second machine-learned scoring model is trained using labeled training data to learn a value for a threshold indicative of whether a score for a particular potential match is considered a match.

13. The system of claim 12, wherein the database is a multi-tenant database.

14. The system of claim 13, wherein the identifying one or more matches comprises:

checking for previously created correspondences among value nodes for domains other than the first domain within a tenant that includes the first user.

15. The system of claim 14, wherein the identifying one or more matches further comprises:

for any value nodes for the tenant that includes the first user in the graph structure that have not yet had a correspondence defined for them, checking for previously created correspondences among value nodes for tenants other than the tenant that includes the first user.

16. The system of claim 15, wherein the identifying one or more matches further comprises:

for any value nodes for the tenant that includes the first user in the graph structure that have not yet had a correspondence defined for them, merging all correspondences in the tenant for domains other than the first domain and identifying a correspondence having a most duplicates in the merge.

17. The system of claim 16, wherein the identifying one or more matches further comprises:

for any value nodes for the tenant that includes the first user in the graph structure that have not yet had a correspondence defined for them, merging all correspondences for tenants other than the tenant that includes the first user identifying a correspondence having a most duplicates in the merge.

18. The system of claim 17, wherein the identifying one or more matches further comprises:

for any value list nodes for the tenant that includes the first user in the graph structure that have not yet had a correspondence defined for them, identifying any correspondences between value nodes having identical values.

19. A method comprising:

accessing a first schema of a database, the first schema having a version, one or more attributes, and defining a set of integrity constraints on how data is organized in the database;

identifying a first value list and a second value list, each being a set of values;

storing the first schema as a first schema node in a graph structure, the graph structure stored in a data store other than the database;

storing the one or more attributes as corresponding one or more attribute nodes in the graph structure;

creating a schema-dependent value list node corresponding to the first value list in the graph structure;

creating an edge between the schema-dependent value list node and a different value node for each value in the set of values in the first value list, the schema-dependent value list node being linked to the first schema node such that the schema-dependent value list node changes in response to the version of the first schema changing;

creating a schema-independent value list node corresponding to the second value list in the graph structure;

creating an edge between the schema-independent value list node and a different value node for each value in the set of values in the second value list, the schema-independent value list node having a version that is independent of the version of the first schema; and traversing the graph structure, and based on edges representing correspondences among nodes in the graph structure found during the traversal, automatically creating a recommendation for a first user in a first domain of a further correspondence to add to the graph structure.

20. A non-transitory machine-readable medium storing instructions which, when executed by one or more processors, cause the one or more processors to perform operations comprising:

accessing a first schema of a database, the first schema having a version, one or more attributes, and defining a set of integrity constraints on how data is organized in the database;

identifying a first value list and a second value list, each being a set of values;

storing the first schema as a first schema node in a graph structure, the graph structure stored in a data store other than the database;

storing the one or more attributes as corresponding one or more attribute nodes in the graph structure;

creating a schema-dependent value list node corresponding to the first value list in the graph structure;

creating an edge between the schema-dependent value list node and a different value node for each value in the set of values in the first value list, the schema-dependent value list node being linked to the first schema node such that the schema-dependent value list node changes in response to the version of the first schema changing;

creating a schema-independent value list node corresponding to the second value list in the graph structure;

creating an edge between the schema-independent value list node and a different value node for each value in the set of values in the second value list, the schema-independent value list node having a version that is independent of the version of the first schema; and traversing the graph structure, and based on edges representing correspondences among nodes in the graph structure found during the traversal, automatically creating a recommendation for a first user in a first domain of a further correspondence to add to the graph structure.

* * * * *